United States Patent
Ogawa et al.

(10) Patent No.: US 6,885,411 B2
(45) Date of Patent: Apr. 26, 2005

(54) LIQUID CRYSTAL DISPLAY MONITOR HAVING AN IMPROVED STRUCTURE FOR MOUNTING A LIQUID CRYSTAL DISPLAY MODULE

(75) Inventors: Kazuhiro Ogawa, Mobara (JP); Nobuyuki Suzuki, Inashiki (JP); Shunsuke Morishita, Mobara (JP); Yasuyuki Mishima, Mobara (JP); Kazunari Ueda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/644,020

(22) Filed: Aug. 20, 2003

(65) Prior Publication Data

US 2004/0085491 A1 May 6, 2004

Related U.S. Application Data

(62) Division of application No. 09/897,041, filed on Jul. 3, 2001, now Pat. No. 6,636,282.

(30) Foreign Application Priority Data

Jul. 5, 2000 (JP) .................................... 2000-203750

(51) Int. Cl.$^7$ .................... G02F 1/1333; G02F 1/1335; G06F 1/16
(52) U.S. Cl. ........................... 349/58; 349/65; 361/683
(58) Field of Search .................... 349/58, 65; 361/681, 361/683

(56) References Cited

U.S. PATENT DOCUMENTS

| | | | |
|---|---|---|---|
| 6,166,788 A | 12/2000 | Ha et al. | 349/58 |
| 6,330,148 B1 | 12/2001 | Won et al. | 361/681 |
| 6,525,790 B1 | 2/2003 | Kan-o | 349/58 |
| 6,593,979 B1 * | 7/2003 | Ha et al. | 349/58 |
| 6,594,143 B1 | 7/2003 | Yano et al. | 361/681 |
| 6,606,241 B1 * | 8/2003 | Moore | 361/685 |

FOREIGN PATENT DOCUMENTS

| | | |
|---|---|---|
| CN | 1257237 A | 12/1999 |
| JP | 5-505247 | 1/1991 |
| WO | WO 91/10936 | 1/1991 |

* cited by examiner

*Primary Examiner*—Tarifur R. Chowdhury
(74) *Attorney, Agent, or Firm*—Reed Smith LLP; Stanley P. Fisher, Esq.; Juan Carlos A. Marquez, Esq.

(57) ABSTRACT

A liquid crystal display monitor includes a liquid crystal display module having a liquid crystal display panel and an illuminating device fixed between first and second frames. The rear surface of the second frame is provided with a tapped hole engaging with a screw, and a thickness of the second frame in the vicinity of the tapped hole is greater than that of the remainder of the second frame. The illuminating device includes plural line light sources behind the panel and a reflector behind the light sources. The reflector is shaped to have portions protruding toward the panel between the light sources and to have portions convex toward the second frame, and the tapped hole is provided in portions of the second frame corresponding to the portions of the reflector protruding toward the panel.

2 Claims, 20 Drawing Sheets

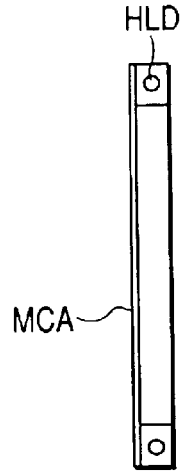
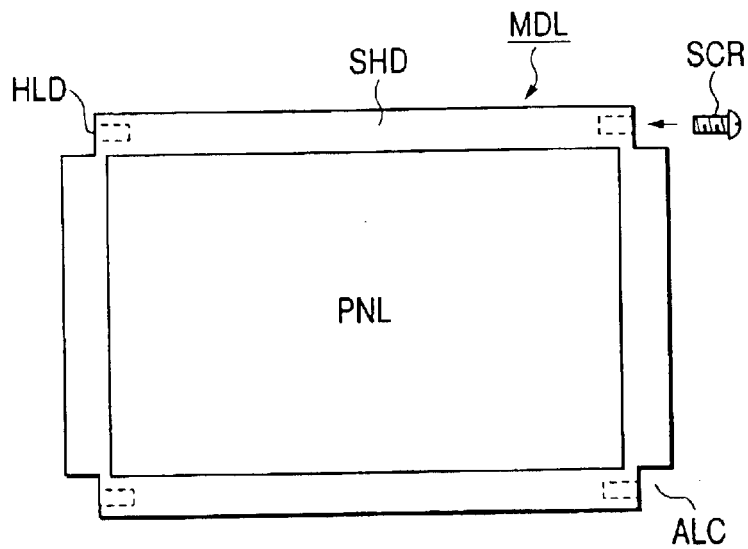
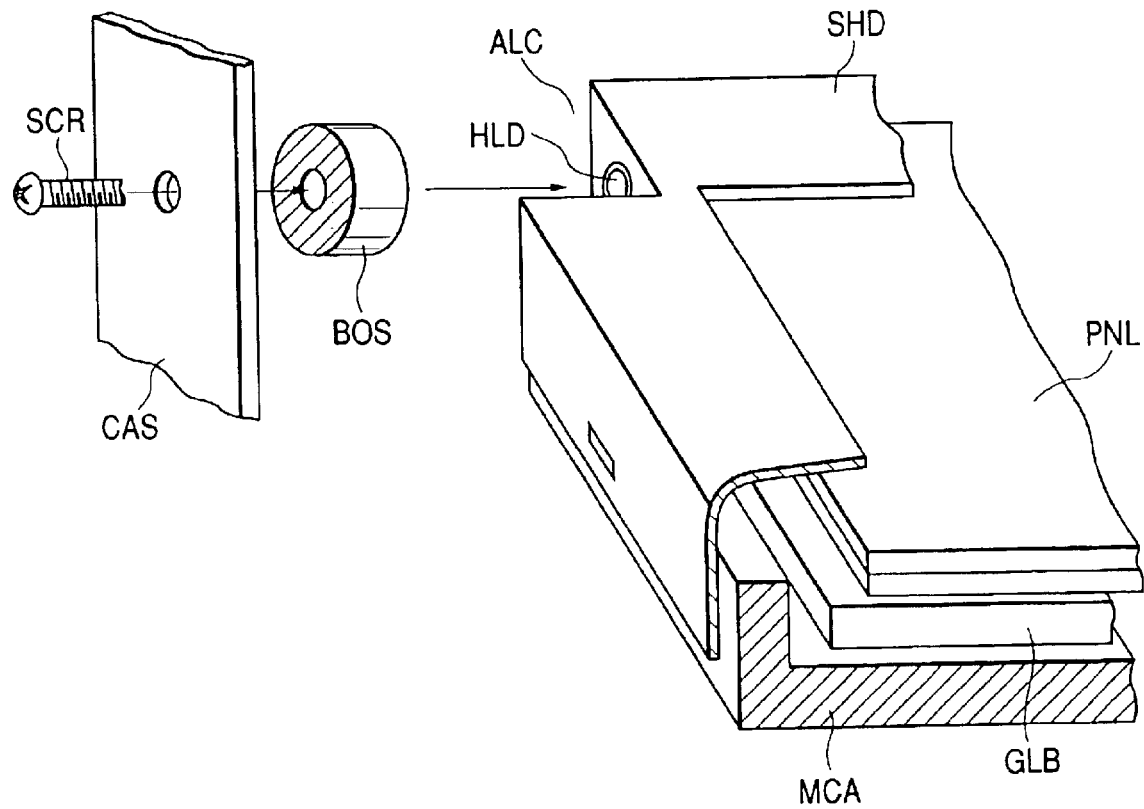

PRIOR ART
FIG. 24A
PRIOR ART
FIG. 24B
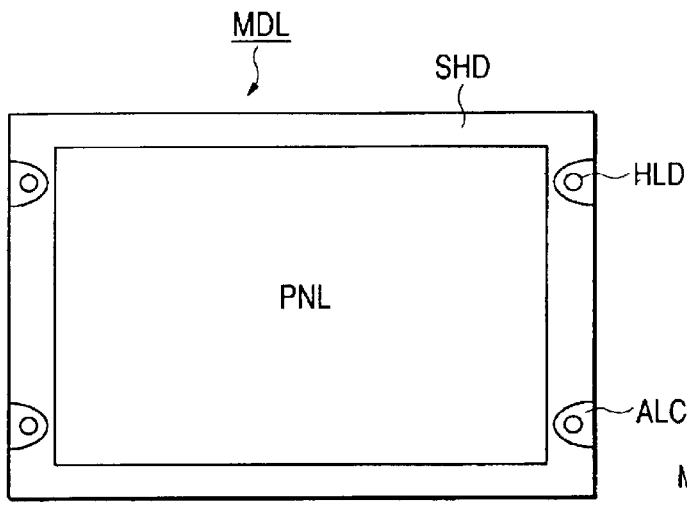
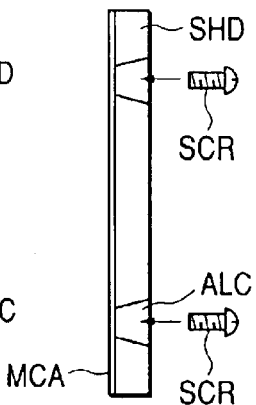
PRIOR ART
FIG. 24C
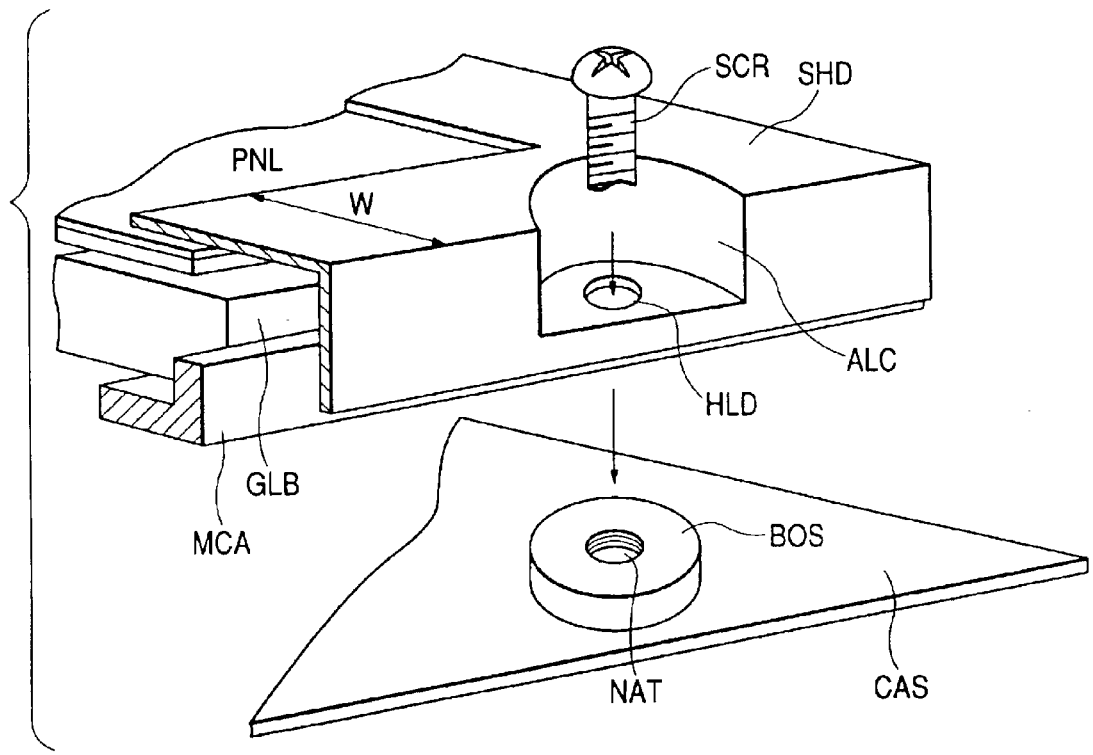

LIQUID CRYSTAL DISPLAY MONITOR HAVING AN IMPROVED STRUCTURE FOR MOUNTING A LIQUID CRYSTAL DISPLAY MODULE

This application is a Divisional of nonprovisional U.S. application Ser. No. 09/897,041 filed on Jul. 3, 2001 now U.S. Pat. No. 6,636,282 Priority is claimed based upon U.S. application Ser. No. 09/897,041. filed on Jul. 3, 2001, which claims the priority of Japanese Application No. 2000-203750 filed on Jul. 5, 2000.

BACKGROUND OF THE INVENTION

The present invention relates to a liquid crystal display module and a liquid crystal display monitor mounting the liquid crystal display module.

The liquid crystal display devices have been widely used as a display device capable of displaying high-definition color images for a notebook personal computer and a display monitor. The liquid crystal display device comprises a liquid crystal display panel having a liquid crystal layer sandwiched between a pair of transparent substrates, an illuminating device for visualizing latent images electronically formed in the liquid crystal display panel, and an optically compensating sheet disposed between the liquid crystal display panel and the illuminating device. These components can be assembled as an integral unit which is capable of being mounted into a notebook personal computer or a liquid crystal display monitor, and which is commonly called a liquid crystal display module.

Among the well-known liquid crystal display devices, one type is a simple-matrix type liquid crystal display device incorporating a simple-matrix type liquid crystal display panel having a liquid crystal layer sandwiched between a pair of substrates each formed with parallel strip electrodes on their inner surfaces arranged such that the parallel strip electrodes on one of the pair of substrates intersect those on the other of the pair of substrates, and another type is an active-matrix type liquid crystal display device incorporating a liquid crystal display panel provided with switching elements on one of a pair of substrates sandwiching a liquid crystal layer such that each of the switching elements selects a corresponding one of pixels of the liquid crystal display panel.

The active-matrix type liquid crystal display panel is divided into a so-called vertical electric field type (commonly called the TN type) which is represented by the TN (Twisted Nematic) type and uses a liquid crystal display panel having plural strip electrodes formed on each of a pair of upper and lower substrates for selecting pixels, and a so-called horizontal electric field type (commonly called IPS (In-Plane Switching) type) which uses a liquid crystal display panel having plural electrodes formed only on one of a pair of upper and lower substrates for selecting pixels.

In the TN type liquid crystal display panel, the liquid crystal molecules are aligned to twist by 90 degrees, for example, between a pair of upper and lower substrates, a pair of polarizers are disposed on the outer surfaces of the upper and lower substrates of the liquid crystal display panel, respectively, with their absorption axes oriented in the cross-Nicole arrangement, and the absorption axis of the entrance-side polarizer is aligned in parallel with or perpendicularly to a rubbing direction of the entrance-side substrate.

In the TN-type active-matrix type liquid crystal display panel, when a voltage is not applied across the liquid crystal layer, the linearly polarized light entering the liquid crystal layer through the entrance-side polarizer propagates along the twist of the liquid crystal molecules of the liquid crystal layer, if the transmission axis of the exit-side polarizer is coincident with the azimuthal angle of the plane of polarization of the linearly polarized light leaving the liquid crystal layer, all the linearly polarized light exits from the liquid crystal display panel to produce a white display (the so-called normally open mode), but, on the other hand, when a voltage is across the liquid crystal layer, a director which is a unit vector representing a direction of the average alignment of the axes of the liquid crystal molecules of the liquid crystal layer is perpendicular to the major surface of the substrate, therefore the azimuthal angle of the plane of polarization of the linearly polarized light entering the liquid crystal layer is not changed, and consequently, the azimuthal angle of the plane of polarization of the linearly polarized light leaving the liquid crystal layer becomes coincident with that of the absorption axis of the exit-side polarizer, and produces a black display (For further detail, see "Basics and Application of Liquid Crystal," Industrial Research Association, Tokyo, 1991.).

On the other hand, in the IPS type liquid crystal display panel which has plural electrodes and wiring therefor for selecting pixels formed only on one of a pair of substrates, switches the liquid crystal molecules in planes parallel with the major surface of the substrates by applying a voltage between adjacent electrodes (a pixel electrode and a counter electrode) on the substrate, the polarization axes of the polarizers are arranged so as to produce a black display when no voltage is applied between the adjacent electrodes (the so-called normally closed mode).

In the IPS type liquid crystal display panel, the liquid crystal molecules in an initial state are in a homogeneous orientation in which the axes of the liquid crystal molecules are parallel with the major surfaces of the substrates, and the director of the liquid crystal molecules are parallel with or inclined at a small angle with a direction of the electrode wiring in planes parallel with the major surfaces of the substrates when no voltage is applied between the adjacent electrodes, and if a voltage is applied between the adjacent electrodes, the director of the liquid crystal molecules rotates toward a direction perpendicular to the direction of the electrode wiring according to the applied voltage. When the director is inclined at 45 degrees with respect to a direction of the director where no voltage is applied between the adjacent electrodes, the liquid crystal layer having a voltage thereacross serves to rotate the the azimuthal angle of plane of polarization through 90 degrees like a half-wave plate such that the azimuthal angle of plane of polarization of the light becomes coincident with the transmission axis of the exit-side polarizer, resulting in production of a white display.

The IPS type liquid crystal display panel has advantages that hue and contrast of a display vary little with viewing angles and consequently, their viewing angles are increased (See Japanese Patent Application National Publication No. Hei 5-505, 247 published on Aug. 5, 1993 which corresponds to WO91/10936 of PCT).

The most commonly used system for producing a full color display in the liquid crystal display devices using the above-explained types of liquid crystal display panels is one using color filters. In this system, one pixel corresponding to one dot capable of producing a color display is subdivided into three subpixels provided with three color filters corresponding to three primary colors, red (R), green (G) and blue (B), for example, respectively.

Recently, the liquid crystal display devices have been increased in screen size and in display resolution, and hence the liquid crystal display modules incorporated into the liquid crystal display device have been increased in weight. As for an external shape of the liquid crystal display modules, there has been a strong demand for reduction of a border area around a useful display area of a notebook personal computer or a liquid crystal display monitor incorporating such liquid crystal display modules. This is attributable to a demand that the outside dimensions of the notebook personal computer or the liquid crystal display monitor be made as small as possible. Hereinafter, the notebook personal computer and the liquid crystal display monitor may be referred to as the liquid crystal display monitor and the like.

The small outside dimensions can mean a superior saving in space, and as for design, the screen area of the liquid crystal display monitor appears larger if its border area around its useful display area is made smaller.

SUMMARY OF THE INVENTION

One of problems to be solved in design for realization of reduction of a border area around a useful display area is how to mount a liquid crystal display module on a display section of a personal computer, a liquid crystal display monitor or the like.

FIGS. 24A–24C are rough illustrations of conventional means for mounting a liquid crystal display module on a liquid crystal display monitor and the like, FIG. 24A is a front view of the liquid crystal display module, FIG. 24B is a side view of the liquid crystal display module of FIG. 24A, and FIG. 24C is an enlarged perspective view of a corner portion of the liquid crystal display module and a portion of the liquid crystal monitor corresponding to the corner portion of the liquid crystal display module of FIG. 24A.

In a liquid crystal display module MDL, a liquid crystal display panel PNL and an illuminating device (a backlight) are fixed together by an upper frame SHD shaped from a metal material to be provided with a shielding function and to serve as an upper case and a lower frame (here a molded case MCA) which serves as a lower case. This backlight is of the so-called edge light type comprising a light guide made of a transparent plate and a line light source disposed at its edge, but only a light guide GLB is shown in FIG. 24C.

Incidentally, the lower frame is not limited to the molded case MCA shaped from a resin material as shown in FIGS. 24A–24C, but a lower frame is also known which is comprised of an intermediate molded frame configured to hold components such as the illuminating device in place and a metal plate disposed behind the intermediate molded frame. In this specification, a lowermost component of the liquid crystal display module is referred to as the lower frame, and the above-mentioned metal plate may be referred to as a rear frame.

A front surface of the upper frame SHD in the form of a rectangular peripheral frame is formed with a recessed portion ALC set back from the front surface in a direction perpendicular to it, and a mounting hole (a hole for receiving a screw) HLD is made in a bottom of the recessed portion ALC. A mounting screw SCR passed through the mounting hole HLD engages with a tapped hole NAT made in a screw-receiving boss BOS provided to a housing CAS of the monitor or the like to fix the module and the housing together.

Incidentally, the molded case MCA shaped from a resin material is used as the lower frame in FIGS. 24B and 24C, but, even if the lower frame is made of metal like the upper frame, the module and the housing of the monitor can be fixed together by the similar mounting structure.

However, with such a mounting structure, there is a limit to reduction of the width W of a border area of the upper frame SHD, a bead or the like needs to be formed around the mounting hole HLD to add to the strength of the portion around it, and consequently, it is difficult to realize the reduction of a border area around a useful display area of the liquid crystal display module.

In another exemplary conventional mounting structure, screw-receiving holes are made in sidewalls of a liquid crystal display module, and the module is secured to a housing of a liquid crystal display monitor or the like by screws extending from the housing into the module and engaging with the screw-receiving holes. In this mounting structure, mounting bosses (members for covering screws, or naves) need to be provided to the housing of the liquid crystal display monitor or the like, therefore the outside dimensions of the housing are increased, and consequently, it is difficult to satisfy the demand that the outside dimensions of the housing of the liquid crystal display monitor and the like be made as small as possible.

As explained above, in the conventional mounting structure for securing the liquid crystal display module to the housing of the liquid crystal display monitor and the like, the width of a border area of the upper frame needs to be wide enough to secure the mechanical strength of tapped holes and portions around the tapped holes, and consequently, it is difficult to realize the required reduction of the width of a border area of the upper frame and the required reduction of the outside dimensions of housings of the monitors and the like.

It is an object of the present invention to eliminate the above-explained problems with the prior art and thereby to provide a liquid crystal display module provided with a novel mounting structure for mounting the liquid crystal display module on a liquid crystal display monitor and the like which is capable of realizing the reduction of the width of a border area of the upper frame of the liquid crystal display module and the reduction of the outside dimensions of housings of a liquid crystal display monitor and the like, and to provide a liquid crystal display monitor mounting the liquid crystal display module.

To accomplish the above-mentioned object, in an embodiment of the liquid crystal display module in accordance with the present invention, the liquid crystal display module is provided with a recessed portion in its outermost sidewall and a screw-receiving hole made in the recessed portion for side mounting. Placement of the screw-receiving hole in the sidewall of the liquid crystal display module makes possible the reduction of a border area around a useful display area of the liquid crystal display module. In the structure of mounting the liquid crystal display module on a display section of a liquid crystal display monitor and the like, placement of a mounting boss in a portion of a housing of the liquid crystal display monitor corresponding to the recessed portion suppresses enlargement of the outside dimensions of the liquid crystal display monitor and the like.

The boss is placed into the recessed portion of the liquid crystal display module, a screw is put into the liquid crystal display module through the mounting boss from the side of the liquid crystal display monitor, and the screw fixes the liquid crystal display module to the liquid crystal display monitor. This mounting structure eliminates the need for increasing the outside dimensions of the liquid crystal display monitor. In this structure, provision of a tapped hole in a molded frame of the liquid crystal display module makes possible the side mounting as in the case of the conventional mounting structure.

If the mounting boss is fabricated integrally with the housing of the liquid crystal display monitor in advance, an additional component is not necessary and the assembly is facilitated. Placement of the tapped holes in the molded frame having the greatest volume in the liquid crystal display module facilitates absorption of external vibrations and shocks. The tapped hole can be made directly in the molded frame, but preferably a metal member formed with the tapped hole, that is, a so-called insert, is embedded in the molded frame beforehand, thereby the mounting strength is increased, and consequently, this mounting structure is capable of maintaining the firm mounting external vibrations and shocks.

The present invention is not limited to the side mounting type, but is also applicable to the rear mounting type in which a liquid crystal display module is fixed to a housing of the liquid crystal display monitor or the like at the rear of the liquid crystal display module. In this case, tapped holes are made in the rear surface of a molded case of the liquid crystal display module. The tapped holes can be made directly in the molded case, or may be made in an insert embedded in the molded case. The reduction of a border area around a useful display area is facilitated because there is no necessity for making tapped holes or the like in the sidewall of the liquid crystal display module, and consequently, the outside dimensions of the liquid crystal display monitor or the like can be reduced. In a case where a downlight type illuminating device (a downlight type backlight) is used in the liquid crystal display module, if the tapped holes are made in portions of the molded case corresponding to peaks of a corrugated reflective plate of the backlight, the liquid crystal display module can be fixed to the housing of the liquid crystal display monitor or the like without increasing the thickness of the liquid crystal display module.

The following explains the representative configurations of the liquid crystal display module and the liquid crystal display monitor (including application to TV receiver sets and the like in addition to computer terminals) in accordance with the present invention.

In accordance with an embodiment of the present invention, there is provided a liquid crystal display module comprising: a liquid crystal display panel having a liquid crystal layer sandwiched between a pair of substrates; an illuminating device disposed behind the liquid crystal display panel; an upper frame; and a lower frame, the upper frame and the lower frame fixing therebetween the liquid crystal display panel and the illuminating device as an integral unit in cooperation with each other, and the upper frame being provided with at least one recessed portion in a sidewall thereof, the at least one recessed portion being set back in a direction parallel with major surfaces of the pair of substrates from the sidewall, and a bottom of the at least one recessed portion being provided with a tapped hole adapted for engagement with a screw for mounting the liquid crystal display module to external equipment.

In accordance with another embodiment of the present invention, there is provided a liquid crystal display module comprising: a liquid crystal display panel having a liquid crystal layer sandwiched between a pair of substrates; an illuminating device disposed behind the liquid crystal display panel; an upper frame; and a lower frame, the upper frame and the lower frame fixing therebetween the liquid crystal display panel and the illuminating device as an integral unit in cooperation with each other, and the upper frame being provided with at least one recessed portion in a sidewall thereof, the at least one recessed portion being set back in a direction parallel with major surfaces of the pair of substrates from the sidewall, a bottom of the at least one recessed portion being provided with a hole adapted for passing therethrough a screw for mounting the liquid crystal display module to external equipment, and a portion of the lower frame facing the hole being provided with a tapped hole adapted for engagement with the screw.

In accordance with another embodiment of the present invention, there is provided a liquid crystal display module comprising: a liquid crystal display panel having a liquid crystal layer sandwiched between a pair of substrates; an illuminating device disposed behind the liquid crystal display panel; an upper frame; and a lower frame, the upper frame and the lower frame fixing therebetween the liquid crystal display panel and the illuminating device as an integral unit in cooperation with each other, and the lower frame being provided with at least one tapped hole in a rear surface thereof adapted for engagement with a screw for mounting the liquid crystal display module to external equipment.

In accordance with another embodiment of the present invention, there is provided a liquid crystal display monitor comprising: a liquid crystal display module including a liquid crystal display panel having a liquid crystal layer sandwiched between a pair of substrates, a first frame and a second frame, the first and second frames fixing the liquid crystal display panel therebetween in cooperation with each other, the first frame being provided with a first sidewall extending along a periphery of the pair of substrates and in a direction of a thickness of the liquid crystal display panel outside of the second frame, the first sidewall being provided with at least one recessed portion set back inwardly from the first sidewall; and a housing having a mounting structure facing the at least one recessed portion, the mounting structure being provided with a screw directed toward the at least one recessed portion such that the liquid crystal display panel is fixed to the housing.

In accordance with another embodiment of the present invention, there is provided a liquid crystal display monitor comprising: a liquid crystal display module including a liquid crystal display panel having a liquid crystal layer sandwiched between a pair of substrates, a first frame and a second frame, the first and second frames fixing the liquid crystal display panel therebetween in cooperation with each other, the first frame being provided with a sidewall extending along a periphery of the pair of substrates and in a direction of a thickness of the liquid crystal display panel outside of the second frame; and a housing having amounting structure facing an outer surface of the first frame and mounting the liquid crystal display panel to the housing, the mounting structure being provided with at least one screw directed toward the sidewall of the first frame for affixing the liquid crystal display panel to the mounting structure, wherein each of the sidewall of the first frame and the mounting structure is provided with a hole for passing each of the at least one screw therethrough, a sidewall of the second frame is provided with a tapped hole for engagement with the at least one screw, and a thickness of the sidewall of the second frame at least in the vicinity of the tapped hole is greater than that of the sidewall of the first frame in the vicinity of the hole provided therein.

In accordance with another embodiment of the present invention, there is provided a liquid crystal display monitor comprising: a liquid crystal display module including a first frame, a liquid crystal display panel having a liquid crystal layer sandwiched between a pair of substrates, an illuminating device disposed behind the liquid crystal display panel, and a second frame arranged in the order named, the first and second frames fixing the liquid crystal display panel and the illuminating device therebetween in cooperation with each other; a housing having a mounting structure facing a rear surface of the second frame and mounting the liquid crystal display panel to the housing, the mounting structure being provided with at least one hole for passing at least one screw therethrough for affixing the liquid crystal display panel to the mounting structure, the rear surface of the second frame being provided with at least one tapped hole for engagement with each of the at least one screw, and a thickness of the rear surface of the second frame in the vicinity of the at least one tapped hole being greater than that of the remainder of the rear surface.

The present invention is not limited to the above configurations, but various changes and modifications may be made without departing from the nature and spirit of the invention. Other objects and configurations of the present invention will be apparent upon consideration of the following detailed description and the drawings.

BRIEF DESCRIPTION OF THE DRAWINGS

In the accompanying drawings, in which like reference numerals designate similar components throughout the figures, and in which:

FIGS. 1A–1C are illustrations of a first embodiment of the liquid crystal display module in accordance with the present invention, FIG. 1A is a front view of the first embodiment, FIG. 1B is a side view of the liquid crystal display module of FIG. 1A and FIG. 1C is an enlarged view of a corner portion of the liquid crystal display module of FIG. 1A;

FIG. 2A is a front view of the second embodiment, FIG. 2B is a side view of the liquid crystal display module of FIG. 2A, and FIG. 2C is an enlarged view of a corner portion of the liquid crystal display module of FIG. 2A;

FIG. 3A is a front view of the third embodiment, FIG. 3B is a side view of the liquid crystal display module of FIG. 3A, and FIG. 3C is an enlarged view of an essential part of a sidewall of the liquid crystal display module of FIG. 3A;

FIG. 4A is a front view of the fourth embodiment, and FIG. 4B is a side view of the liquid crystal display module of FIG. 4A;

FIG. 5A is a front view of the fifth embodiment, FIG. 5B is a left-hand side view of the liquid crystal display module of FIG. 5A, and FIG. 5C is a right-hand side view of the liquid crystal display module of FIG. 5A;

FIGS. 24A–24C are rough illustrations of conventional means for mounting a liquid crystal display module to a liquid crystal display monitor or the like, FIG. 24A is a front view of the liquid crystal display module, FIG. 24B is a side view of the liquid crystal display module of FIG. 24A, and FIG. 24C is an enlarged perspective view of a corner portion of the liquid crystal display module and a portion of the liquid crystal monitor corresponding to the corner portion of the liquid crystal display module of FIG. 24A.

DETAILED DESCRIPTION

Figure 2A:
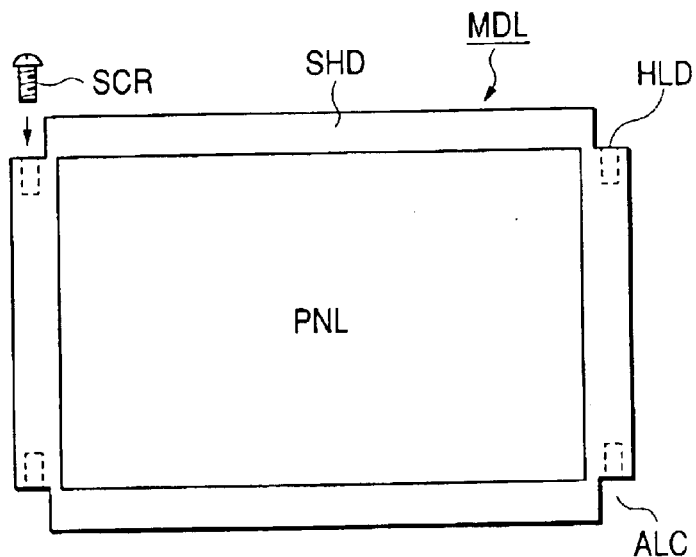
FIGS. 2A–2C are illustrations of a second embodiment of the liquid crystal display module in accordance with the present invention.

The embodiments of the present invention will now be explained in detail by reference to the drawings.

FIGS. 1A–1C are illustrations of a first embodiment of the liquid crystal display module in accordance with the present invention, FIG. 1A is a front view of the first embodiment, FIG. 1B is a side view of the liquid crystal display module of FIG. 1A, and FIG. 1C is an enlarged view of a corner portion of the liquid crystal display module of FIG. 1A.

In FIGS. 1A and 1C, reference character PNL denotes a liquid crystal display panel. This liquid crystal display panel is integrated with an illuminating device (only a light guide GLB of which is shown in FIG. 1C), an optical compensating sheet (not shown) and others into a single integral component by using an upper frame SHD and a molded case MCA which serves as a lower frame, and the integral components are placed on the market.

In this embodiment, the upper frame SHD constituting a liquid crystal display module MDL is provided with a recessed portion ALC at each of the four corners of the outermost sidewall such that the recessed portions ALC have a bottom set back horizontally in FIG. 1A from the sidewall in parallel with short sides of the liquid crystal display panel PNL. Each of the recessed portions ALC is formed with a screw-receiving hole HLD extending in a direction of the setback of the recessed portions ALC at its bottom.

Behind the screw-receiving holes HLD are the molded case MCA which serves as a lower frame, and the molded case MCA is formed with tapped holes (not shown) at portions of the molded case MCA facing the respective screw-receiving holes HLD.

In mounting the liquid crystal display module MDL on a case of the liquid crystal display monitor or the like (hereinafter a monitor case) CAS, a screw SCR is inserted into a respective screw-receiving hole HLD of the liquid crystal display module MDL from its side facing a boss BOS provided to the monitor case CAS, and is engaged with a respective tapped hole of the molded case MCA such that the liquid crystal display module is fixed to the monitor case.

The present embodiment makes possible reduction of a border area around a useful display area of the liquid crystal display module MDL. Enlargement of the outside dimensions of the liquid crystal display monitor and the like is suppressed by placement of the mounting bosses BOS on portions of the monitor case CAS of the liquid crystal display monitor corresponding to the recessed portions ALC.

When the recessed portions ALC are set back by 5 mm, for example, from the sidewall of the liquid crystal display module MDL, the bosses BOS are provided on the monitor case CAS of the liquid crystal display monitor or the like such that they extend by 5 mm toward the liquid crystal display module. The bosses BOS are inserted into the recessed portions ALC of the liquid crystal display module MDL, and the screws SCR are inserted into the bosses BOS and then are engaged with the liquid crystal display module MDL.

This mounting structure eliminates the need for enlarging the outside dimensions of the liquid crystal display monitor. The provision of the tapped holes in the molded case MCA of the liquid crystal display module MDL makes possible the mounting of the liquid crystal display module by the side mount system as in the case of the prior art.

Throughout this specification and the appended claims, when the boss is referred to, it is to be understood as including the boss fabricated integrally with the monitor case CAS, the boss which is fabricated separately from the monitor case CAS and then is fixed to the monitor case CAS, and the boss which is fabricated separately from the monitor case CAS and is used as a sleeve without being fixed to the monitor case CAS.

However, if the bosses are fabricated integrally with the monitor case CAS of the liquid crystal display monitor or the like in advance, additional components are not necessary, and also its assembling operation is facilitated. Further, placement of the tapped holes in the molded case MCA having the greatest volume in the liquid crystal display module MDL facilitates absorption of external vibrations and shocks.

Figure 2B:
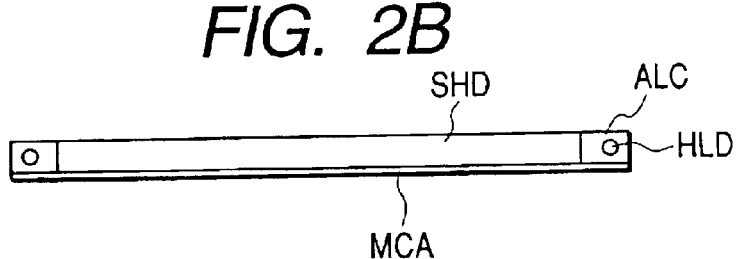
Figure 2C:
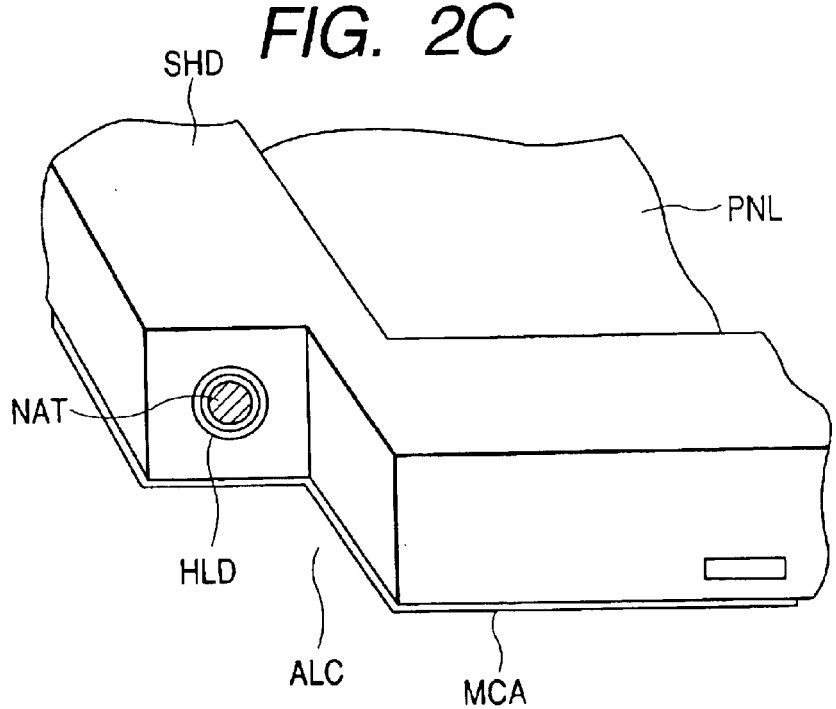

FIGS. 2A–2C are illustrations of a second embodiment of the liquid crystal display module in accordance with the present invention, FIG. 2A is a front view of the second embodiment, FIG. 2B is a side view of the liquid crystal display module of FIG. 2A, and FIG. 2C is an enlarged view of a corner portion of the liquid crystal display module of FIG. 2A. The same reference characters and numerals as utilized in FIGS. 1A to 1C designate functionally corresponding portions in FIGS. 2A to 2C.

In this embodiment, the upper frame SHD constituting a liquid crystal display module MDL is provided with a recessed portion ALC at each of the four corners of the outermost sidewall such that the recessed portions ALC have a bottom set back vertically in FIG. 2A from the sidewall in parallel with long sides of the liquid crystal display panel PNL. Each of the recessed portions ALC is formed with a screw-receiving hole HLD extending in a direction of the setback of the recessed portions ALC at its bottom.

Behind the screw-receiving holes HLD are the molded case MCA which serves as a lower frame, and the molded case MCA is formed with tapped holes NAT at portions of the molded case MCA facing the respective screw-receiving holes HLD.

Mounting of the liquid crystal display module MDL on a case of the liquid crystal display monitor and the like will be explained by reference to FIGS. 1A–1C. However, the direction of the setback of the recessed portion ALC in this embodiment differs by 90 degrees from that of the recessed portion ALC in FIG. 1C in which the bosses BOS are provided at the top and bottom sides of the liquid crystal display module MDL. Screws SCR are inserted into the respective screw-receiving holes HLD of the liquid crystal display module MDL from their sides facing the bosses BOS and are engaged with the respective tapped holes NAT of the molded case MCA such that the liquid crystal display module is fixed to the monitor case.

The present embodiment makes possible reduction of a border area around a useful display area of the liquid crystal display module MDL. Enlargement of the outside dimensions of the liquid crystal display monitor and the like is suppressed by placement of the mounting bosses BOS on portions of the monitor case CAS of the liquid crystal display monitor corresponding to the recessed portions ALC.

When the recessed portions ALC are set back by 5 mm, for example, from the sidewall of the liquid crystal display module MDL as in the case of the first embodiment shown in FIGS. 1A–1C, the bosses BOS are provided on the monitor case CAS of the liquid crystal display monitor or the like such that they extend by 5 mm toward the liquid crystal display module MDL. The bosses BOS are inserted into the recessed portions ALC of the liquid crystal display module MDL, and the screws SCR are inserted into the bosses BOS and then are engaged with the liquid crystal display module MDL.

This mounting structure eliminates the need for enlarging the outside dimensions of the liquid crystal display monitor. The provision of the tapped holes NAT in the molded case MCA of the liquid crystal display module MDL makes possible the mounting of the liquid crystal display module by the side mount system as in the case of the prior art.

If the bosses BOS are fabricated integrally with the monitor case CAS of the liquid crystal display monitor or the like in advance, additional components are not necessary, and also its assembling operation is facilitated. Further, placement of the tapped holes in the molded case MCA having the greatest volume in the liquid crystal display module MDL facilitates absorption of external vibrations and shocks.

Figure 3A:
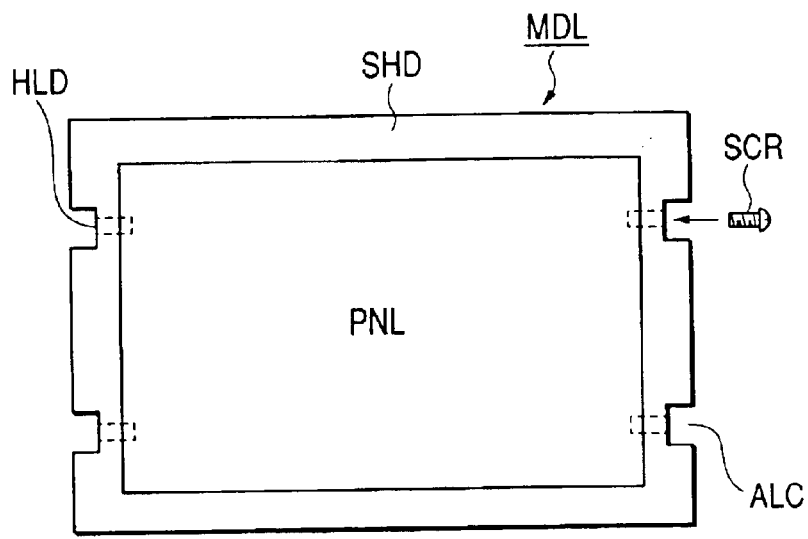
FIGS. 3A–3C are illustrations of a third embodiment of the liquid crystal display module in accordance with the present invention.
Figure 3B:
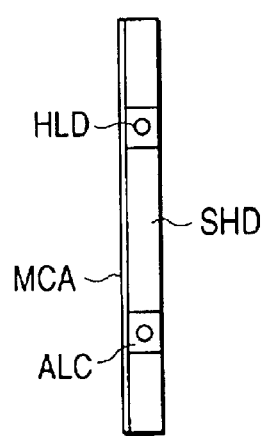
Figure 3C:
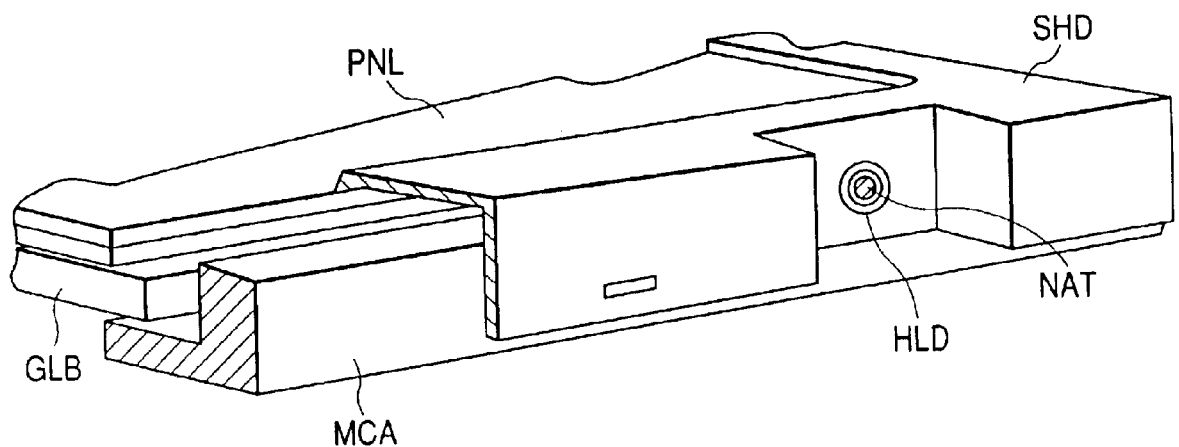

FIGS. 3A–3C are illustrations of a third embodiment of the liquid crystal display module in accordance with the present invention, FIG. 3A is a front view of the third embodiment, FIG. 3B is a side view of the liquid crystal display module of FIG. 3A, and FIG. 3C is an enlarged view of an essential portion of a sidewall of the liquid crystal display module of FIG. 3A. The same reference characters and numerals as utilized in FIGS. 1A to 1C and 2A to 2C designate functionally corresponding portions in FIGS. 3A to 3C.

In this embodiment, the upper frame SHD constituting a liquid crystal display module MDL is provided with two recessed portions ALC at each of the left-hand and right-hand sides of its outermost sidewall such that the recessed portions ALC have a bottom set back horizontally in FIG. 3A from the sidewall in parallel with short sides of the liquid crystal display panel PNL. Each of the recessed portions ALC is formed with a screw-receiving hole HLD extending in a direction of the setback of the recessed portions ALC at its bottom.

Behind the screw-receiving holes HLD are the molded case MCA which serves as a lower frame, and the molded case MCA is formed with tapped holes NAT at portions of the molded case MCA facing the screw-receiving holes HLD.

In mounting the liquid crystal display module MDL on a case of the liquid crystal display monitor or the like, screws SCR are inserted into the screw-receiving holes HLD of the liquid crystal display module MDL from their sides facing the bosses provided to the monitor case as in the case of FIGS. 1A–1C, and are engaged with the tapped holes NAT of the molded case MCA such that the liquid crystal display module is fixed to the monitor case.

The present embodiment also makes possible reduction of a border area around a useful display area of the liquid crystal display module MDL. Enlargement of the outside dimensions of the liquid crystal display monitor and the like is suppressed by placement of the mounting bosses on portions of the monitor case of the liquid crystal display monitor corresponding to the recessed portions ALC.

When the recessed portions ALC are set back by 5 mm, for example, from the sidewall of the liquid crystal display module MDL as in the embodiments explained in connection with FIGS. 1A–1C and 2A–2C, the bosses are provided on the monitor case of the liquid crystal display monitor or the like such that they extend by 5 mm toward the liquid crystal display module. The bosses are inserted into the recessed portions ALC of the liquid crystal display module MDL, and the screws SCR are inserted into the bosses and then are engaged with the liquid crystal display module MDL.

This mounting structure eliminates the need for enlarging the outside dimensions of the liquid crystal display monitor. The provision of the tapped holes NAT in the molded case MCA of the liquid crystal display module MDL makes possible the mounting of the liquid crystal display module by the side mount system as in the case of the prior art.

If the bosses are fabricated integrally with the monitor case of the liquid crystal display monitor or the like in advance, additional components are not necessary, and also its assembling operation is facilitated. Further, placement of the tapped holes NAT in the molded case MCA having the greatest volume in the liquid crystal display module MDL facilitates absorption of external vibrations and shocks.

Figure 4A:
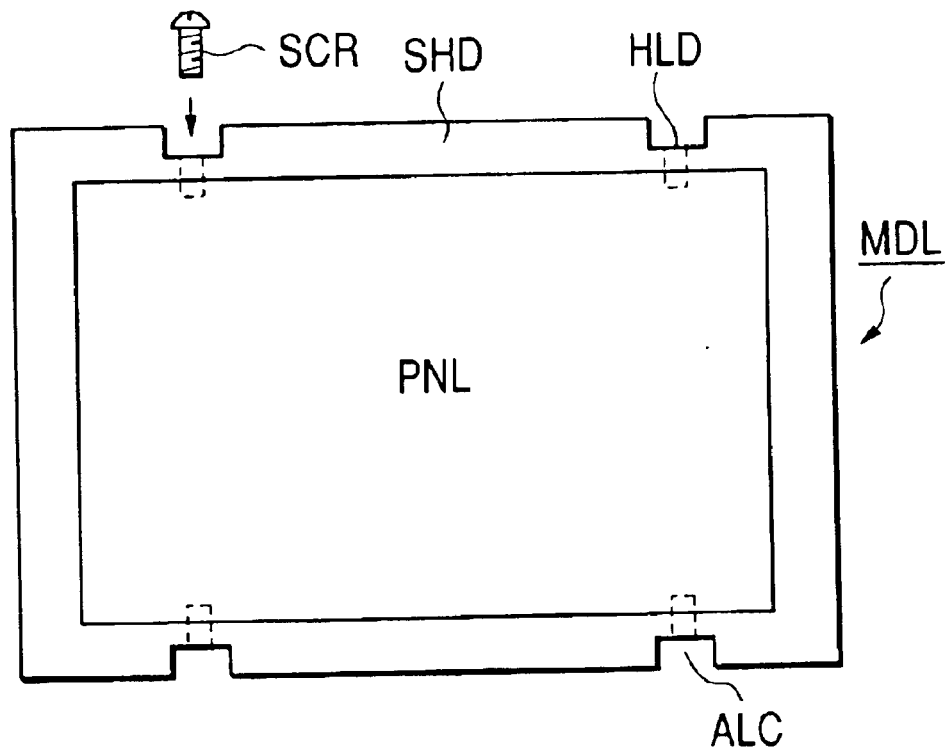
FIGS. 4A and 4B are illustrations of a fourth embodiment of the liquid crystal display module in accordance with the present invention.
Figure 4B:
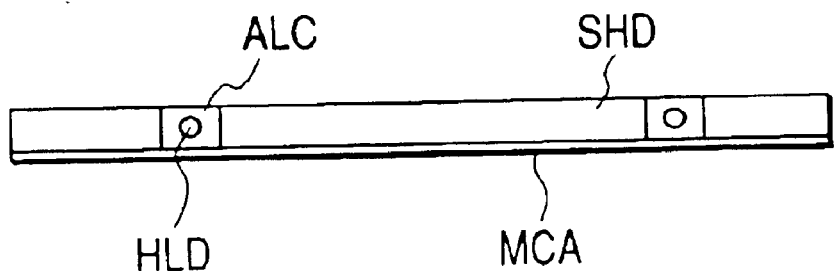

FIGS. 4A and 4B are illustrations of a fourth embodiment of the liquid crystal display module in accordance with the present invention, FIG. 4A is a front view of the fourth embodiment, and FIG. 4B is a side view of the liquid crystal display module of FIG. 4A. The same reference characters and numerals as utilized in FIGS. 3A to 3C designate functionally corresponding portions in FIGS. 4A and 4B.

In this embodiment, the upper frame SHD constituting a liquid crystal display module MDL is provided with two recessed portions ALC at each of the top and bottom sides of its outermost sidewall such that the recessed portions ALC each have a bottom set back vertically in FIG. 4A from the sidewall in parallel with top and bottom sides of the liquid crystal display panel PNL. Each of the recessed portions ALC is formed with a screw-receiving hole HLD extending in a direction of the setback of the recessed portions ALC at its bottom.

Behind the screw-receiving holes HLD are the molded case MCA which serves as a lower frame, and the molded case MCA is formed with tapped holes NAT at portions of the molded case MCA facing the screw-receiving holes HLD.

In mounting the liquid crystal display module MDL on a case of the liquid crystal display monitor or the like, screws SCR are inserted into the screw-receiving holes HLD of the liquid crystal display module MDL from their sides facing the bosses provided to the monitor case as in the case of FIGS. 1A–1C, and are engaged with the tapped holes NAT of the molded case MCA such that the liquid crystal display module is fixed to the monitor case.

The present embodiment also makes possible reduction of a border area around a useful display area of the liquid crystal display module MDL. Enlargement of the outside dimensions of the liquid crystal display monitor and the like is suppressed by placement of the mounting bosses on portions of the monitor case of the liquid crystal display monitor corresponding to the recessed portions ALC.

When the recessed portions ALC are set back by 5 mm, for example, from the sidewall of the liquid crystal display module MDL as in the embodiments explained in connection with FIGS. 1A–1C, 2A–2C and 3A–3C, the bosses are provided on the monitor case of the liquid crystal display monitor or the like such that they extend by 5 mm toward the liquid crystal display module MDL. The bosses are inserted into the recessed portions ALC of the liquid crystal display module MDL, and the screws SCR are inserted into the bosses and then are engaged with the liquid crystal display module MDL.

This mounting structure eliminates the need for enlarging the outside dimensions of the liquid crystal display monitor. The provision of the tapped holes NAT in the molded case MCA of the liquid crystal display module MDL makes possible the mounting of the liquid crystal display module by the side mount system as in the case of the prior art.

If the bosses are fabricated integrally with the monitor case of the liquid crystal display monitor or the like in advance, additional components are not necessary, and also its assembling operation is facilitated. Further, placement of the tapped holes NAT in the molded case MCA having the greatest volume in the liquid crystal display module MDL facilitates absorption of external vibrations and shocks.

Figures 5A, 5B, 5C:
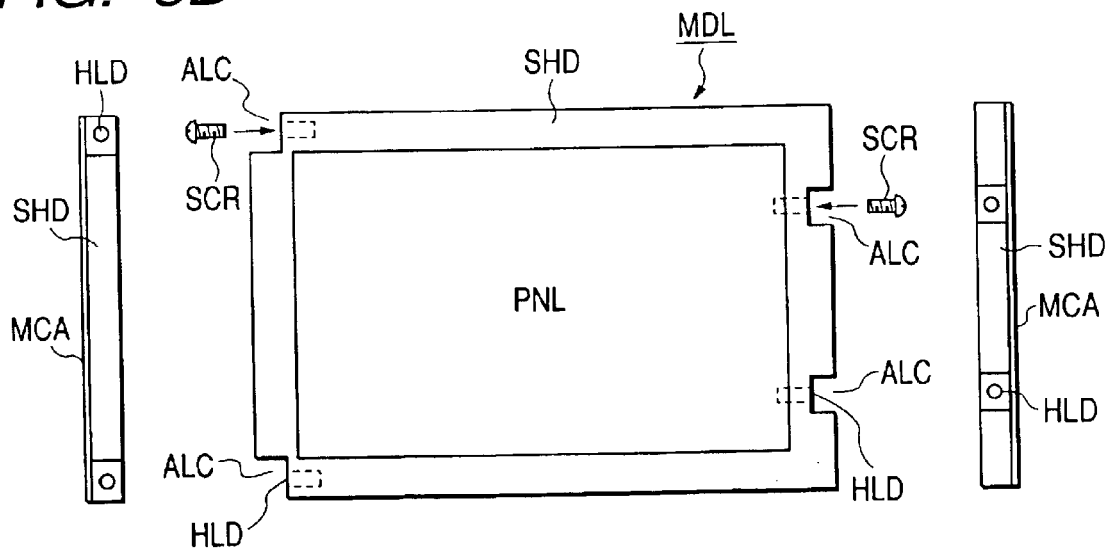
FIGS. 5A–5C are illustrations of a fifth embodiment of the liquid crystal display module in accordance with the present invention.

FIGS. 5A–5C are illustrations of a fifth embodiment of the liquid crystal display module in accordance with the present invention, FIG. 5A is a front view of the fifth embodiment, FIG. 5B is a left-hand side view of the liquid crystal display module of FIG. 5A, and FIG. 5C is a side view of the liquid crystal display module of FIG. 5A. The same reference characters and numerals as utilized in FIGS. 1A–1C and 3A–3C designate functionally corresponding portions in FIGS. 5A–5C.

In this embodiment, the upper frame SHD constituting a liquid crystal display module MDL is provided with two recessed portions ALC similar to those in FIGS. 1A–1C at its left-hand side and two recessed portions ALC similar to those in FIGS. 3A–3C at its right-hand side. Each of the recessed portions ALC is formed with a screw-receiving hole HLD extending in a direction of the setback of the recessed portions ALC at its bottom.

Behind the screw-receiving holes HLD are the molded case MCA which serves as a lower frame as in the previous embodiments, and the molded case MCA is formed with tapped holes at portions of the molded case MCA facing the screw-receiving holes HLD.

In mounting the liquid crystal display module MDL on a case of the liquid crystal display monitor or the like, screws SCR are inserted into the screw-receiving holes HLD of the liquid crystal display module MDL from their sides facing the bosses provided to the monitor case as in the case of FIGS. 1A–1C or FIGS. 3A–3C, and are engaged with the tapped holes of the molded case MCA such that the liquid crystal display module is fixed to the monitor case.

The present embodiment also makes possible reduction of a border area around a useful display area of the liquid crystal display module MDL. Enlargement of the outside dimensions of the liquid crystal display monitor and the like is suppressed by placement of the mounting bosses on portions of the monitor case of the liquid crystal display monitor corresponding to the recessed portions ALC.

When the recessed portions ALC are set back by 5 mm, for example, from the sidewall of the liquid crystal display module MDL as in the embodiments explained in connection with FIGS. 1A–1C, 2A–2C, 3A–3C and 4A–4B, the bosses are provided on the monitor case of the liquid crystal display monitor or the like such that they extend by 5 mm toward the liquid crystal display module MDL. The bosses are inserted into the recessed portions ALC of the liquid crystal display module MDL, and the screws SCR are inserted into the bosses and then are engaged with the liquid crystal display module MDL.

This mounting structure eliminates the need for enlarging the outside dimensions of the liquid crystal display monitor. The provision of the tapped holes in the molded case MCA of the liquid crystal display module MDL makes possible the mounting of the liquid crystal display module by the side mount system as in the case of the prior art.

If the bosses are fabricated integrally with the monitor case of the liquid crystal display monitor or the like in advance, additional components are not necessary, and also its assembling operation is facilitated. Further, placement of the tapped holes in the molded case MCA having the greatest volume in the liquid crystal display module MDL facilitates absorption of external vibrations and shocks.

Figure 6:
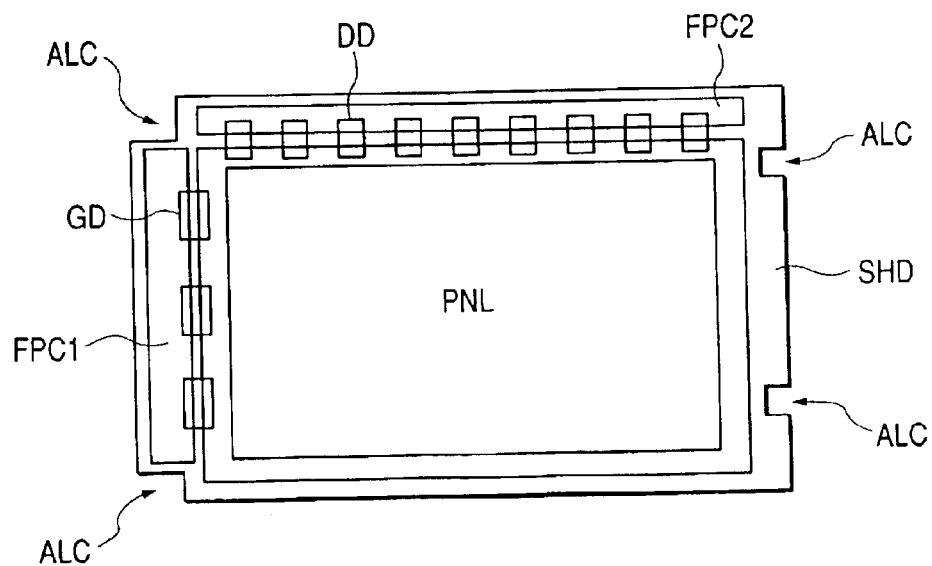
FIG. 6 is a schematic plan view for illustrating an exemplary configuration of a liquid crystal display panel and a printed circuit board mounting thereon a driving circuit for the liquid crystal display panel in the fifth embodiment illustrated in FIGS. 5A–5C.

FIG. 6 is a schematic plan view for illustrating an exemplary arrangement of a liquid crystal display panel and a printed circuit board mounting thereon a driving circuit for the liquid crystal display panel which constitute the liquid crystal display module of the fifth embodiment illustrated in FIGS. 5A–5C. Drain drivers are disposed at at least one of top and bottom sides of the liquid crystal display panel, and gate drivers are disposed at one of the left-hand and right-hand sides of the liquid crystal display panel. In FIG. 6, a printed circuit board FPC1 mounting the gate drivers GD thereon is disposed at the left-hand side of the liquid crystal display panel PNL, and a printed circuit board FPC2 mounting the drain drivers DD thereon is disposed at the top side of the liquid crystal display panel PNL. In FIG. 6, the upper frame SHD is indicated by an outline.

In the liquid crystal display panel PNL constituting the liquid crystal display module MDL in the embodiment explained in connection with FIGS. 5A–5C, it is difficult to dispose the screw-receiving holes ALC in the side of the upper frame SHD on which the printed circuit board is disposed because the printed circuit board interferes with the disposition of the screw-receiving holes ALC. Therefore, in the left-hand side of the upper frame SHD where the printed circuit board FPC1 for the gate drivers is disposed, the two screw-receiving holes ALC are disposed at the top and bottom corners of the upper frame SHD, respectively, and on the other hand, in the right-hand side of the upper frame SHD, the two screw-receiving holes ALC are disposed at two positions displaced inwardly from the top and bottom corners, respectively. In addition, the two ends of the printed circuit board FPC1 for the gate drivers are retracted inwardly to secure sufficient space at the corners.

In this structure, the border area of the upper frame SHD is restricted by the widths of the printed circuit boards FPC1 and FPC2 only, and consequently, this facilitates reduction of the border area of the upper frame SHD.

In the above embodiments, the number of the screw-receiving holes is selected to be four, but is not limited to four, and provision of at least two screw-receiving holes makes possible the mounting of the liquid crystal display module on the monitor case of the liquid crystal display monitor or the like.

By cutting out or retracting only portions of the printed circuit boards corresponding to the screw-receiving holes, the liquid crystal display module having reduced a border area around its useful display area is realized, and consequently, the liquid crystal display monitor or the like is obtained which is capable of limiting an increase in its outside dimensions.

Figure 7A:
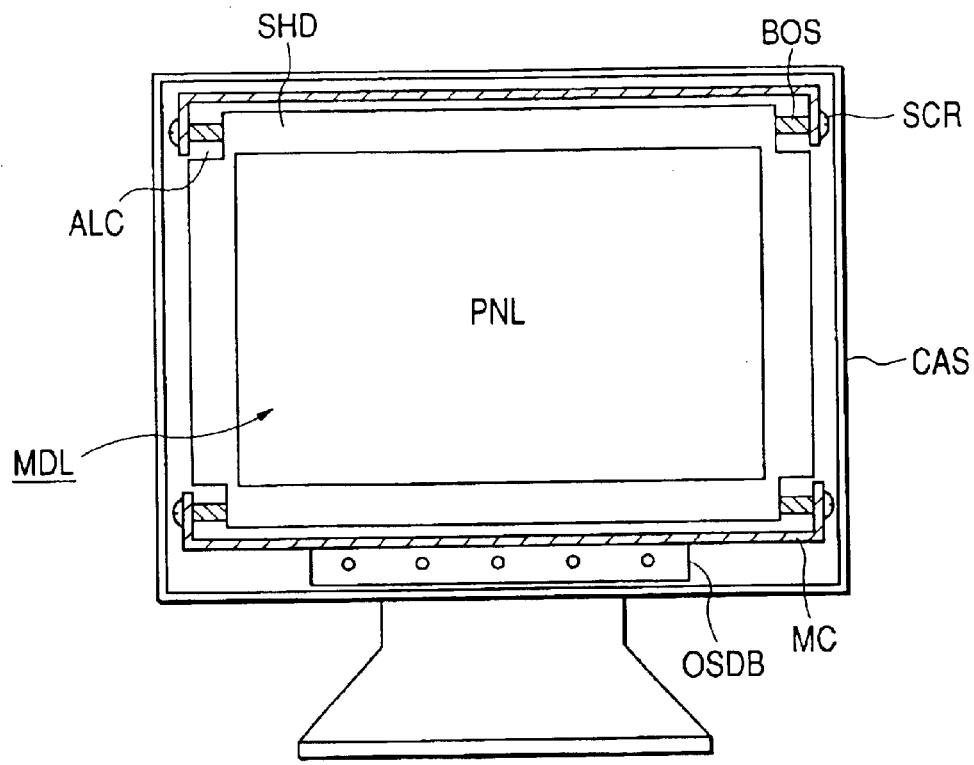
FIG. 7A is a front view of a liquid crystal display monitor with its front cover removed for illustrating a liquid crystal display module mounted therein wherein the liquid crystal display module is provided with a recessed portion for mounting at each of four corners thereof in accordance with the present invention.
Figure 7B:
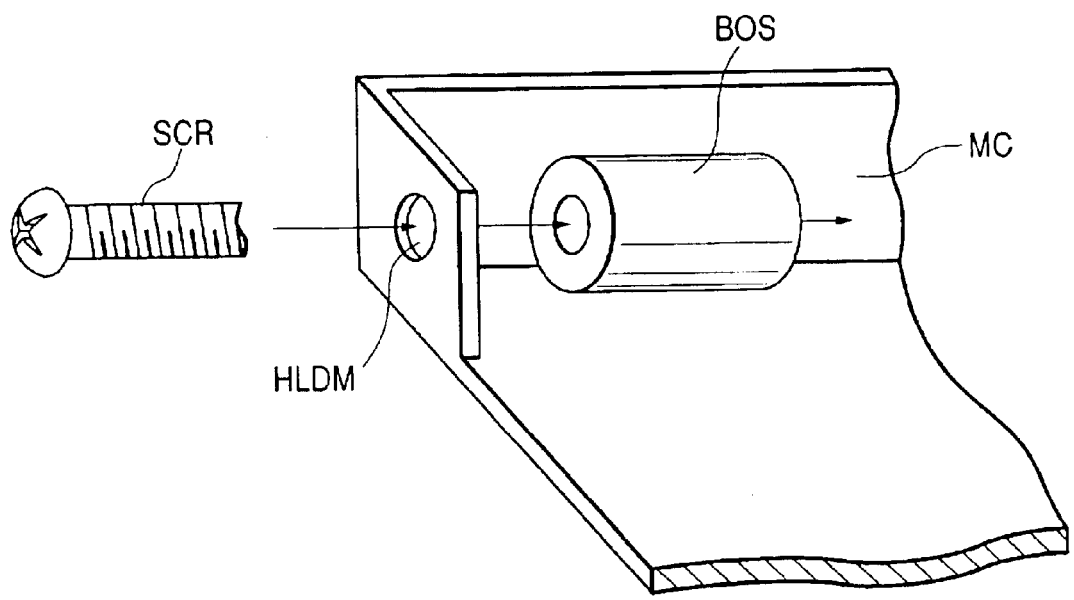
FIG. 7B is a perspective view of an essential part of a module-receiving member employed in the liquid crystal display monitor of FIG. 7A.

FIG. 7A is a front view of a liquid crystal display monitor with its front cover removed for illustrating a liquid crystal display module mounted therein in accordance with the present invention. The liquid crystal display module is provided with a recessed portion for mounting at each of four corners thereof in accordance with an embodiment of the present invention. FIG. 7B is a perspective view of an essential part of a module-receiving member employed in the liquid crystal display monitor of FIG. 7A. Reference character OSDB in FIG. 7A denotes an on-screen display circuit board having mounted thereon a adjusting circuit for performing the on-screen display (adjusting operation of luminance, contrast and chromaticity).

A module receiving member MC shaped from a metal plate as shown in FIG. 7B is disposed within the monitor case CAS constituting a display section. The module receiving member MC is turned up at portions of its top, bottom, left-hand and right-hand sides. The turned-up portions at the left-hand and right-hand sides are formed with screw-receiving holes HLDM for passing mounting screws. The liquid crystal display module MDL in FIG. 7A is the same as that in the embodiment explained in connection with FIGS. 1A–1C.

The bosses BOS are placed in the recessed portions ALC formed at the four corners of the liquid crystal display module MDL, and the screws SCR are inserted into the recessed portions ALC through the screw-receiving holes HLDM made in the module receiving member MC, and then are engaged with the tapped holes made in the molded case such that the liquid crystal display module MDL is fixed to the module receiving member MC.

With this configuration, the liquid crystal display module having reduced a border area around its useful display area can be mounted on the liquid crystal display monitor without increasing its outside dimensions, and consequently, the liquid crystal display monitor is realized which has a large screen and features a saving of space.

Figure 8:
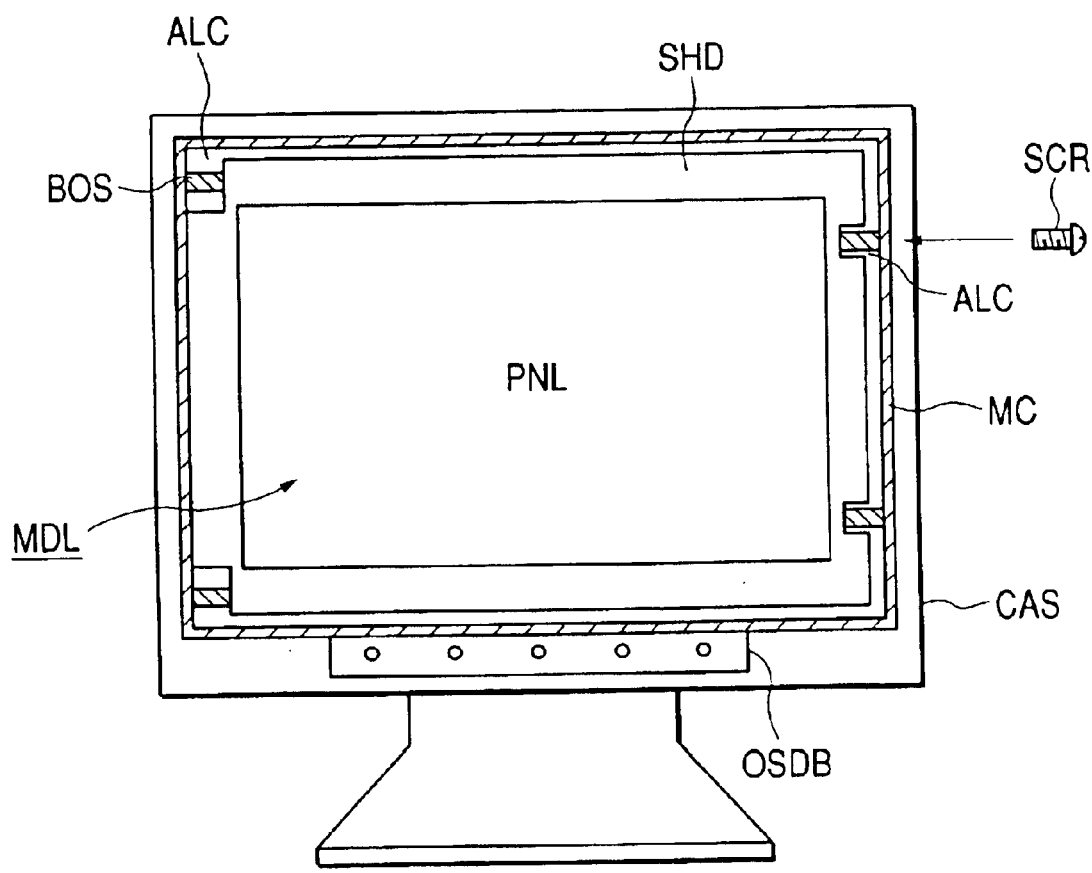
FIG. 8 is a front view of a liquid crystal display monitor with its front cover removed for illustrating a liquid crystal display module mounted therein wherein the liquid crystal display module is provided with a recessed portion for mounting at each of two adjacent corners of one of two opposite sides of the liquid crystal display module and is also provided with two recessed portions for mounting between two adjacent corners of the other of the two opposite sides in accordance with the present invention.

FIG. 8 is a front view of a liquid crystal display monitor with its front cover removed for illustrating a liquid crystal display module mounted therein in accordance with the present invention. The liquid crystal display module is provided with a recessed portion for mounting at each of two adjacent corners of one of two opposite sides of the liquid crystal display module, and is also provided with two recessed portions for mounting between two adjacent corners of the other of the two opposite sides. Reference character OSDB in FIG. 8 denotes an on-screen display circuit board having mounted thereon a adjusting circuit for performing the on-screen display (adjusting operation of luminance, contrast and chromaticity).

The liquid crystal display module MDL housed within the dish-shaped module receiving member MC is housed within the monitor case CAS constituting a display section of the liquid crystal display monitor.

The liquid crystal display module-MDL is provided with a recessed portion ALC for mounting at each of two adjacent corners of one (a left-hand side in FIG. 8) of two opposite sides of the liquid crystal display module, and is also provided with two recessed portions for mounting between two adjacent corners of the other (a right-hand side) of the two opposite sides.

Figure 9:
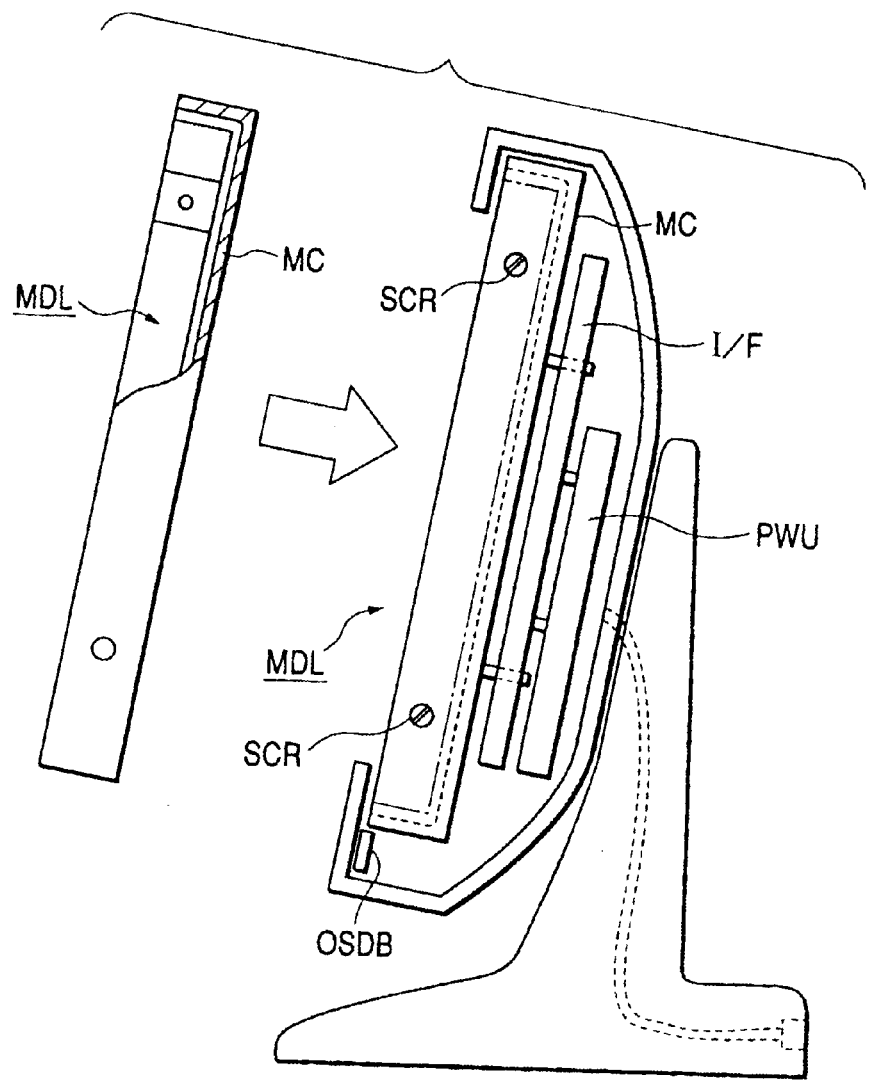
FIG. 9 is a schematic cross-sectional view of the liquid crystal display monitor of FIG. 8 illustrating its mounting structure.

FIG. 9 is a schematic cross-sectional view of the liquid crystal display monitor of FIG. 8 illustrating its mounting structure. The same reference characters and numerals as utilized in FIG. 8 designate functionally corresponding portions in FIG. 9. The liquid crystal display module MDL housed within the dish-shaped module receiving member MC is housed within the monitor case CAS constituting a display section of the liquid crystal display monitor.

Incidentally, disposed behind the liquid crystal display module MDL are an interface board I/F and a power supply board mounting a power supply circuit PWU.

The mounting structure for the above-describe liquid crystal display module is such that the screws are inserted into the liquid crystal display module from the module receiving member MC side to be engaged with the liquid crystal display module so as to fix the liquid crystal display module to the module receiving member MC.

However, the liquid crystal display modules may be fixed to the module receiving member MC by securing the module receiving member MC to the rear of the liquid crystal display module by screws inserted from the bottom of the dish-shaped module receiving member MC by using the liquid crystal display modules described subsequently in connection with FIGS. 14–16. First, the interface board, the power supply board and others are attached to the rear of the liquid crystal display module, and then the liquid crystal display module is fixed to the module receiving member MC by screws passing through the bottom of the module receiving member MC. If the screw-head side part of the tapped holes made in the module receiving member MC is enlarged so that the screw heads do not protrude from the bottom of the module receiving member MC, the increase in the thickness of the liquid crystal display monitor can be suppressed.

Further, the increase in the thickness of the liquid crystal display monitor is suppressed by making a large opening in the bottom of the module receiving member MC (removing portions such as a central portion of the bottom excluding portions formed with the tapped holes) or by providing in the bottom of the module receiving member MC a recessed portion set back outwardly or inwardly from the bottom of the module receiving member MC, and thereby placing the interface board, the power supply board and others in the large opening or the recessed portion.

In the liquid crystal display monitor shown in FIGS. 7A, 7B, 8 and 9, the structures for mounting the liquid crystal display modules MDL to the monitor case GAS of the liquid crystal display monitors do not increase the width of the monitor case CAS, and consequently, the outside dimensions of the liquid crystal display monitors per se do not need to be increased. Therefore the present invention provides the liquid crystal display monitor having a display screen appearing visually large.

Exemplary concrete configurations of tapped holes made in the molded case of the liquid crystal display module will now be explained by reference to FIGS. 10–16.

Figure 10:
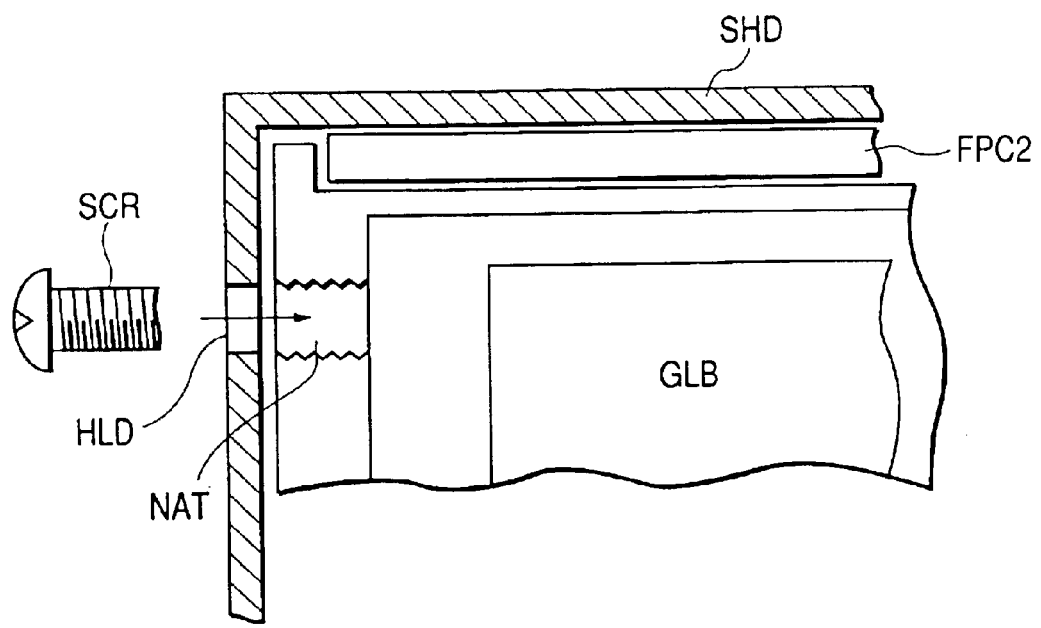
FIG. 10 is a cross-sectional view of an essential part of a liquid crystal display module in accordance with the present invention for illustrating a first embodiment of a tapped hole for engagement with a screw for mounting the liquid crystal display module to external equipment.

FIG. 10 is a cross-sectional view of an essential part of a liquid crystal display module in accordance with the present invention for illustrating a first embodiment of a tapped hole for engagement with a screw for mounting the liquid crystal display module to external equipment, and illustrates a portion of the liquid crystal display module in the vicinity of the printed circuit FPC2 of the drain drivers disposed at the long side of the liquid crystal display panel and the light guide GLB constituting an illumination device. In this embodiment, tapped holes NAT are made directly in the turned-up portions (the peripheral sidewalls) of the molded case MCA which serves as the lower frame of the liquid crystal display module. Vibrations and shocks externally applied to the liquid crystal display monitor or the like having the liquid crystal display module mounted thereto are transmitted to the liquid crystal display module via the screws, and the vibrations and shocks are applied directly to the molded case because the tapped holes are made in the molded case. The molded case is coextensive with the liquid crystal display module, and consequently, the vibrations and shocks are prevented from concentrating into specific portions and therefore they do not influence operation of liquid crystal display module.

Figure 11:
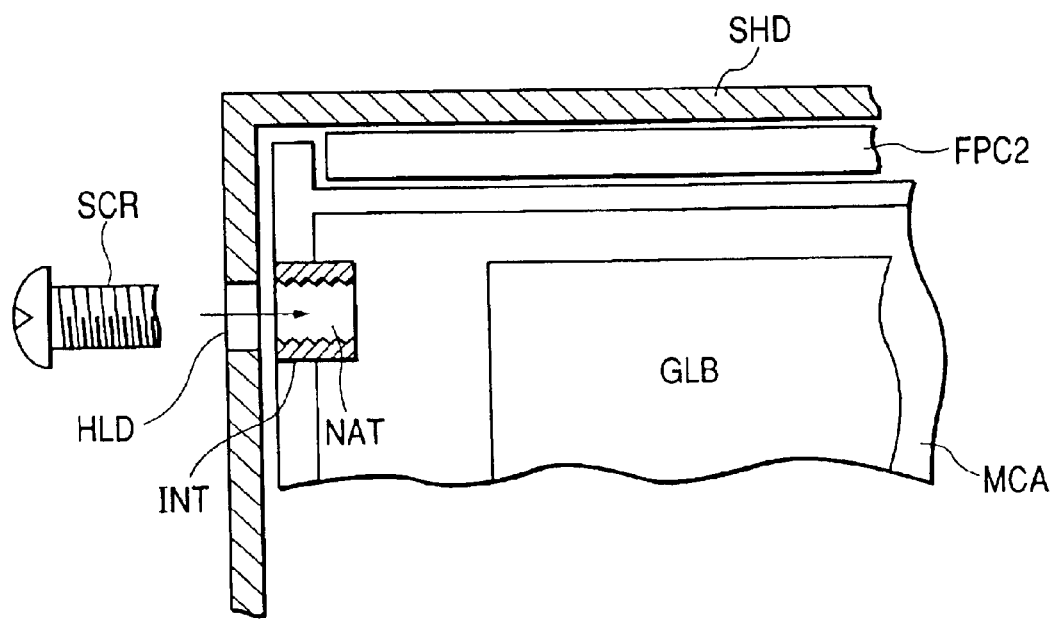
FIG. 11 is a cross-sectional view of an essential part of a liquid crystal display module in accordance with the present invention for illustrating a second embodiment of a tapped hole for engagement with a screw for mounting the liquid crystal display module to external equipment.

FIG. 11 is a cross-sectional view of an essential part of a liquid crystal display module in accordance with the present invention for illustrating a second embodiment of a tapped hole for engagement with a screw for mounting the liquid crystal display module to external equipment, and illustrates a portion of the liquid crystal display module corresponding to that shown in FIG. 10. In this embodiment, metal inserts INT for forming tapped holes NAT therein are embedded in the turned-up portions (the peripheral sidewalls) of the molded case MCA which serves as the lower frame of the liquid crystal display module. The metal insert INT can be embedded at the time of molding the case, therefore the operation of assembling the liquid crystal display monitor is the same as in the embodiment described in connection with FIG. 10, and this embodiment provides the same advantages as those provided by the embodiment of FIG. 10.

Figure 12:
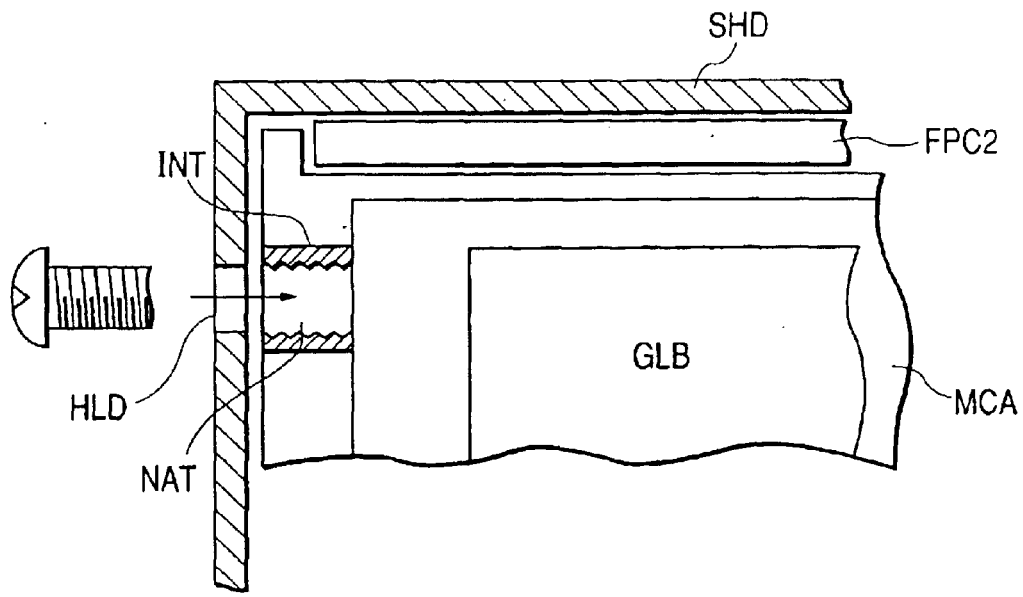
FIG. 12 is a cross-sectional view of an essential part of a liquid crystal display module in accordance with the present invention for illustrating a third embodiment of a tapped hole for engagement with a screw for mounting the liquid crystal display module to external equipment.

FIG. 12 is a cross-sectional view of an essential part of a liquid crystal display module in accordance with the present invention for illustrating a third embodiment of a tapped hole for engagement with a screw for mounting the liquid crystal display module to external equipment, and illustrates a portion of the liquid crystal display module corresponding to that shown in FIG. 10. In this embodiment, metal inserts INT for forming tapped holes NAT therein are embedded in the turned-up portions (the peripheral sidewalls) of the molded case MCA which serves as the lower frame of the liquid crystal display module as in the embodiment shown in FIG. 11, but the thickness of a portion of the molded case where the metal insert INT is embedded is made approximately equal to the length of the metal insert INT. With this configuration, the liquid crystal display module is more firmly and securely mounted to the external equipment, the assembling operation and the advantages are the same as in the embodiments shown in FIG. 10.

Figure 13:
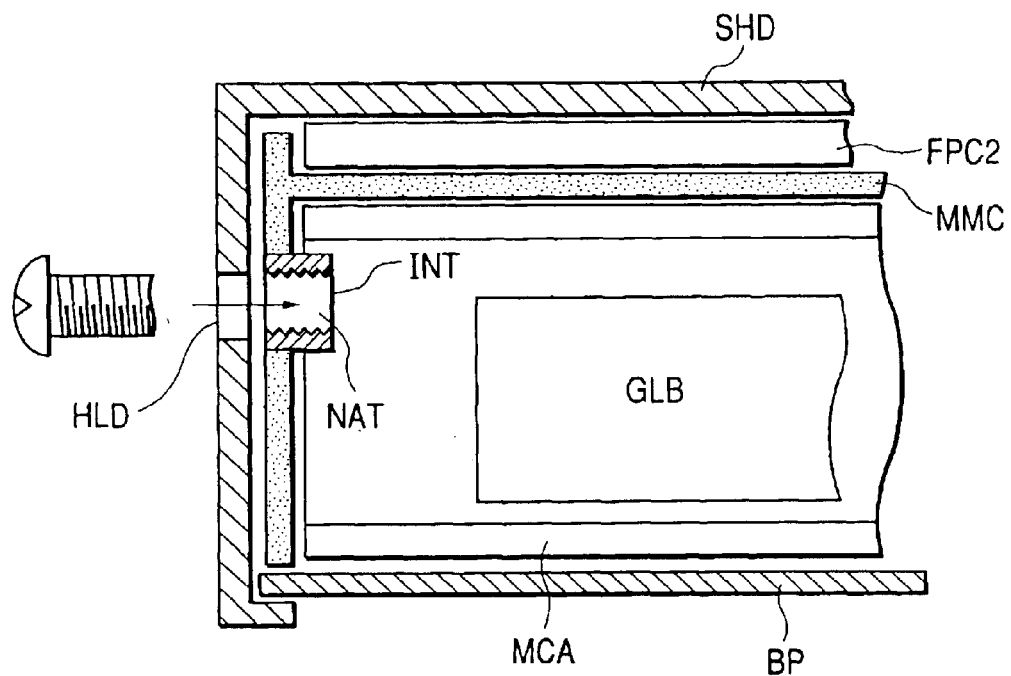
FIG. 13 is a cross-sectional view of an essential part of a liquid crystal display module in accordance with the present invention for illustrating a fourth embodiment of a tapped hole for engagement with a screw for mounting the liquid crystal display module to external equipment.

FIG. 13 is a cross-sectional view of an essential part of a liquid crystal display module in accordance with the present invention for illustrating a fourth embodiment of a tapped hole for engagement with a screw for mounting the liquid crystal display module to external equipment, and illustrates a portion of the liquid crystal display module corresponding to that shown in FIG. 10.

In this embodiment, the liquid crystal display module is provided with an intermediate molded frame MMC and a rear frame BP made of a metal plate disposed behind the molded case MCA which serves as the lower frame. The metal inserts INT are embedded in the intermediate molded case MMC. The metal inserts INT can be embedded at the time of molding the intermediate molded case MMC, therefore the operation of assembling the liquid crystal display monitor is facilitated, and this embodiment provides the same advantages as those provided by the previous embodiments. If the thickness of portions of the intermediate molded case MMC where the metal inserts are embedded is made approximately equal to the length of the metal insert INT as in the molded case MCA shown in FIG. 10, the liquid crystal display module is more firmly and securely mounted to the external equipment.

Figure 14:
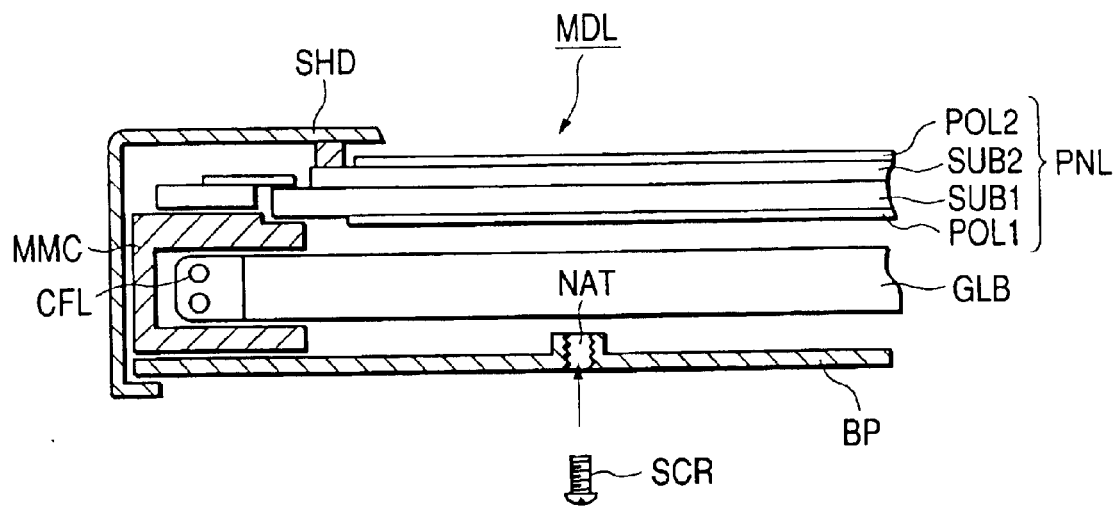
FIG. 14 is a cross-sectional view of an essential part of a sixth embodiment of the liquid crystal display module in accordance with the present invention.

FIG. 14 is a cross-sectional view of an essential part of a sixth embodiment of the liquid crystal display module in accordance with the present invention. This embodiment can be applicable to a liquid crystal display module incorporated into a display section of a notebook personal computer, but is rather suitable for liquid crystal display monitors having larger display screen. The liquid crystal display panel PNL comprises a liquid crystal layer sandwiched between a pair of glass substrates SUB1 and SUB2 and a pair of polarizers POL1, POL2 disposed behind the substrate SUB1 and disposed in front of the substrate SUB2. The illuminating device (backlight) comprised of the light guide GLB and a cold cathode fluorescent lamp CFL is disposed behind the liquid crystal display panel PNL. The liquid crystal display panel PNL and the illuminating device are held in place by the intermediate molded case MMC, and are assembled as an integral unit by the upper frame SHD and the metal rear frame BP.

The liquid crystal display module is mounted to a display section of the liquid crystal display monitor by inserting screws SCR into the tapped holes NAT made in the rear frame BP from its liquid crystal display monitor side and then engaging the screws with the tapped holes NAT.

Figure 15:
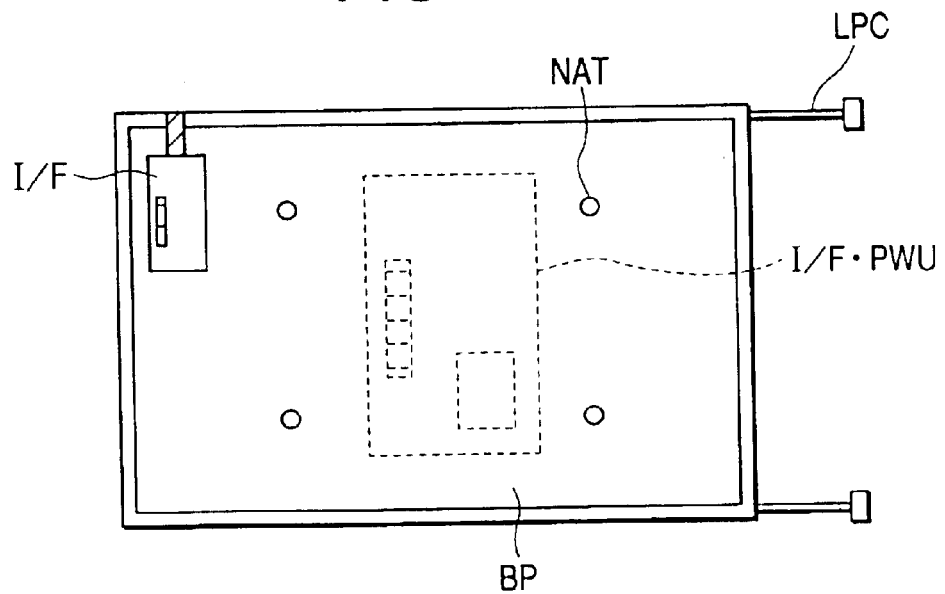
FIG. 15 is a schematic plan view of the rear of the liquid crystal display module shown in FIG. 14 for illustrating an example of a configuration of its rear side.

FIG. 15 is a schematic plan view of the liquid crystal display module shown in FIG. 14 for illustrating an example of a configuration of its rear. The tapped holes NAT are made at four positions of the rear frame BP. In this type of liquid crystal display modules, there is enough freedom of design in selecting a dimension in a direction of their thickness, and therefore, the interface board I/F, the power supply board mounting the power supply circuit PWU, or the interface•power supply board I/F•PWU mounting the interface circuit and power supply circuit PWU, of the liquid crystal display module can be attached to the rear surface or the inside of the rear surface of the rear frame BP as shown in FIG. 15. In FIG. 15, reference character LPC denotes a power line for supplying a supply voltage to the illuminating device. In this embodiment, the tapped holes NAT are illustrated as made directly in the rear frame BP, but, instead of this, nuts can be fixed to the rear frame BP by welding or crimping.

The configuration of this embodiment eliminates the need for disposing a mounting structure at the sidewalls of the liquid crystal display module which interferes with the reduction of a border area around a useful display area of the liquid crystal display module, therefore do not increase the outside dimensions of the liquid crystal display monitor, and also the reduction of a border area around a useful display area of the liquid crystal display module per se is easily realized, and consequently, the present embodiment provides the liquid crystal display monitor having a display screen appearing visually large.

Figure 16:
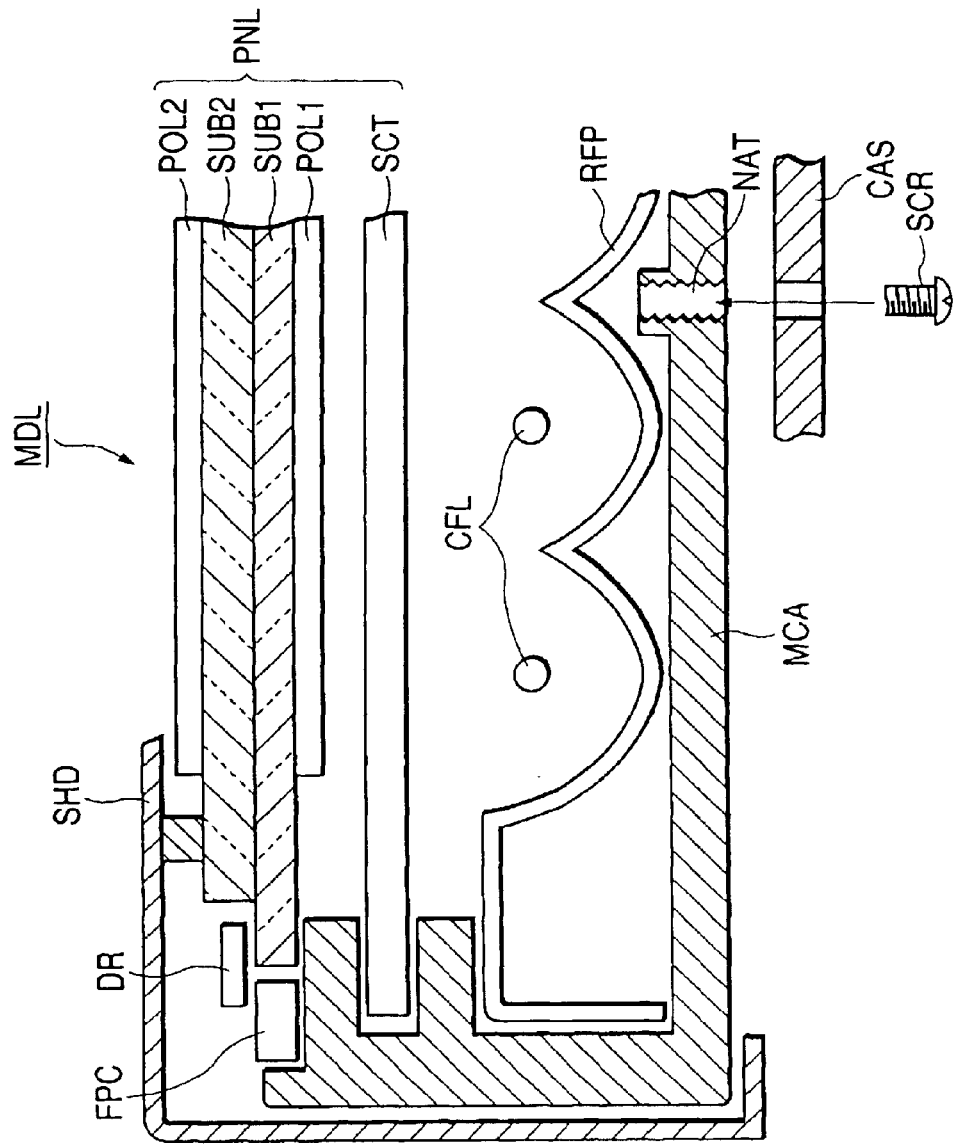
FIG. 16 is a cross-sectional view of an essential part of a seventh embodiment of the liquid crystal display module in accordance with the present invention.

FIG. 16 is a cross-sectional view of an essential part of a seventh embodiment of the liquid crystal display module in accordance with the present invention. This embodiment is the liquid crystal display module provided with the downlight type illuminating device, for the liquid crystal display monitor. In FIG. 16, reference character SCT denotes a light diffusing plate, DR is a drain or gate driver (an integrated circuit), FPC is a printed circuit board for drain drivers or gate drivers, CFL are linear lamps (cold cathode fluorescent lamps), and RFP is a reflective plate. The liquid crystal display panel PNL in FIG. 16 is identical with that shown in FIG. 14, the downlight type illuminating device comprises the plural linear lamps CFL arranged behind the liquid crystal display panel PNL and the corrugated reflective plate RFP having a cross section in the form of a series of smoothly connected peaks and valleys, and the light diffusing plate SCT is interposed between the liquid crystal display panel PNL and the downlight type illuminating device.

The liquid crystal display panel PNL, the light diffusing plate SCT and the downlight type illuminating device are held in place by the molded case MCA, and are assembled together with the upper frame SHD as an integral unit.

The liquid crystal display module MDL is fixed to the liquid crystal display monitor by inserting screws SCR into the tapped holes NAT made in portions of the lower frame MCA corresponding to the peaks of the corrugated reflective plate RFP from the end of the tapped holes NAT facing the monitor case GAS of the liquid crystal display monitor, and engaging the screws SCR with the tapped holes NAT.

As explained above, in this embodiment, the tapped holes NAT are positioned at positions of the lower frame MCA corresponding to spaces below the peaks of the corrugated reflective plate RFP, and consequently, this arrangement eliminates the need for increasing the thickness of the liquid crystal display module for the purpose of mounting the liquid crystal display module. Further, like the embodiment shown in FIG. 14, this embodiment does not need provision of the mounting structure at the sidewall of the liquid crystal display module which interferes with the reduction of a border area around a useful display area of the liquid crystal display module, therefore the outside dimensions of the liquid crystal display monitor are not increased, the reduction of a border area around the useful display area of the liquid crystal display module per se is easily realized, and consequently, this embodiment provides the liquid crystal display monitor the display screen of which appears visually large.

In this embodiment, the tapped holes NAT are made directly in the molded case MCA, but instead the inserts can be embedded in the molded case MCA beforehand as in the embodiments shown in FIGS. 10–13.

The above-described embodiments in accordance with the present invention are capable of realizing the reduction of a border area around a useful display area of the liquid crystal display module, and realizing the reduction of the outside dimensions of the housings (cases) of the liquid crystal display monitor or the like.

An example of a circuit configuration and a driving scheme for the liquid crystal display panel to which the present invention is applicable will now be explained by reference to FIGS. 17–21.

Figure 17:
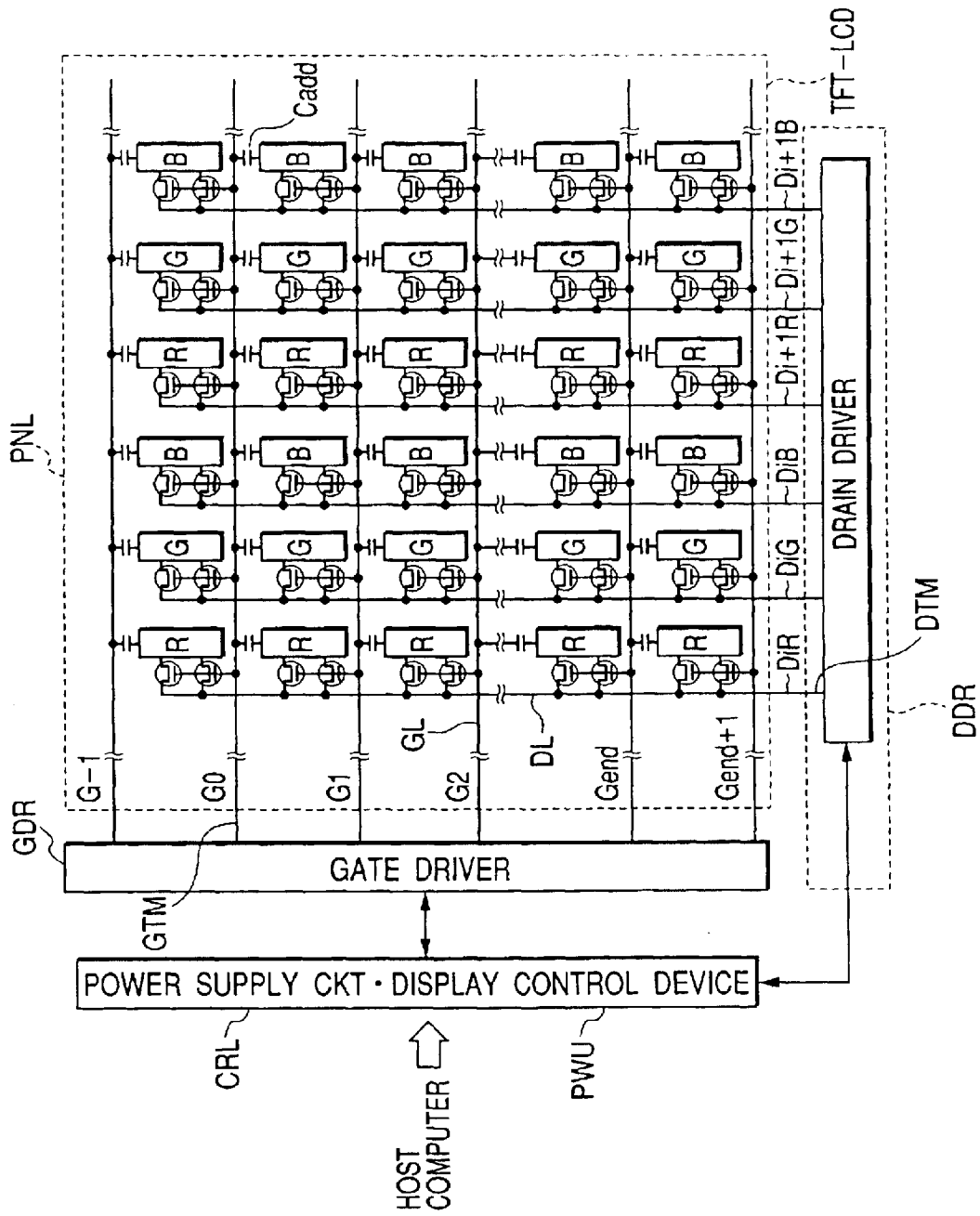
FIG. 17 is an illustration of an equivalent circuit of a liquid crystal display panel and driving circuits for the liquid crystal display panel in a liquid crystal display module.

FIG. 17 illustrates an equivalent circuit of the liquid crystal display panel and its driving circuit section constituting the liquid crystal display module. This liquid crystal display panel is of the thin film transistor type (the TFT-LCD). Two thin film transistors TFT constituting a unit pixel are disposed in each of regions enclosed by two adjacent ones of drain signal lines DL and two adjacent ones of gate signal lines GL, but the number of the thin film transistors TFT is not limited to two, and at least one thin film transistor suffices for each of the regions (The number of the thin film transistors TFT can be arbitrarily selected according to a specification of the liquid crystal display panel). Drain electrodes and gate electrodes of the thin film transistors TFT are connected to the drain signal lines DL (DiR, DiG, DiB, . . . ) and the gate signal lines GL (G0, G1, . . . ), respectively. Reference character R, G and B denote pixel electrodes constituting pixels for red, green and blue, respectively, GTM are leads for external connections of gate signal lines, DTM are leads for external connections of drain signal lines, DDR is a drain driver, GDR is a gate driver, PWU is a power supply circuit, and CRL is a display control device.

Source electrodes of the thin film transistors TFT are connected to the pixel electrodes, a liquid crystal layer is disposed between the pixel electrodes and a common electrode (not shown) fabricated on a substrate arranged to face another substrate having the pixel electrodes fabricated thereon, and therefore a liquid crystal capacitance CLC (not shown) is connected between each of the source electrodes of the thin film transistors TFT and the common electrode in the equivalent circuit.

If a positive bias voltage is applied to the gate electrode of the thin film transistor TFT, the thin film transistor TFT conducts, and if a negative bias is applied to the gate electrode, the thin film transistor TFT does not conduct. Further, a storage capacitance Cadd is connected between the source of the thin film transistor TFT and a gate signal line of a scanning line immediately preceding the gate signal line of the scanning line associated with the thin film transistor.

Source and drain designations depend upon the polarity of a bias voltage between them, the polarity of the bias voltage in this liquid crystal display device is reversed during operation, and therefore it should be noted that the roles of the source and drain electrodes are interchanged during the operation.

Figure 18:
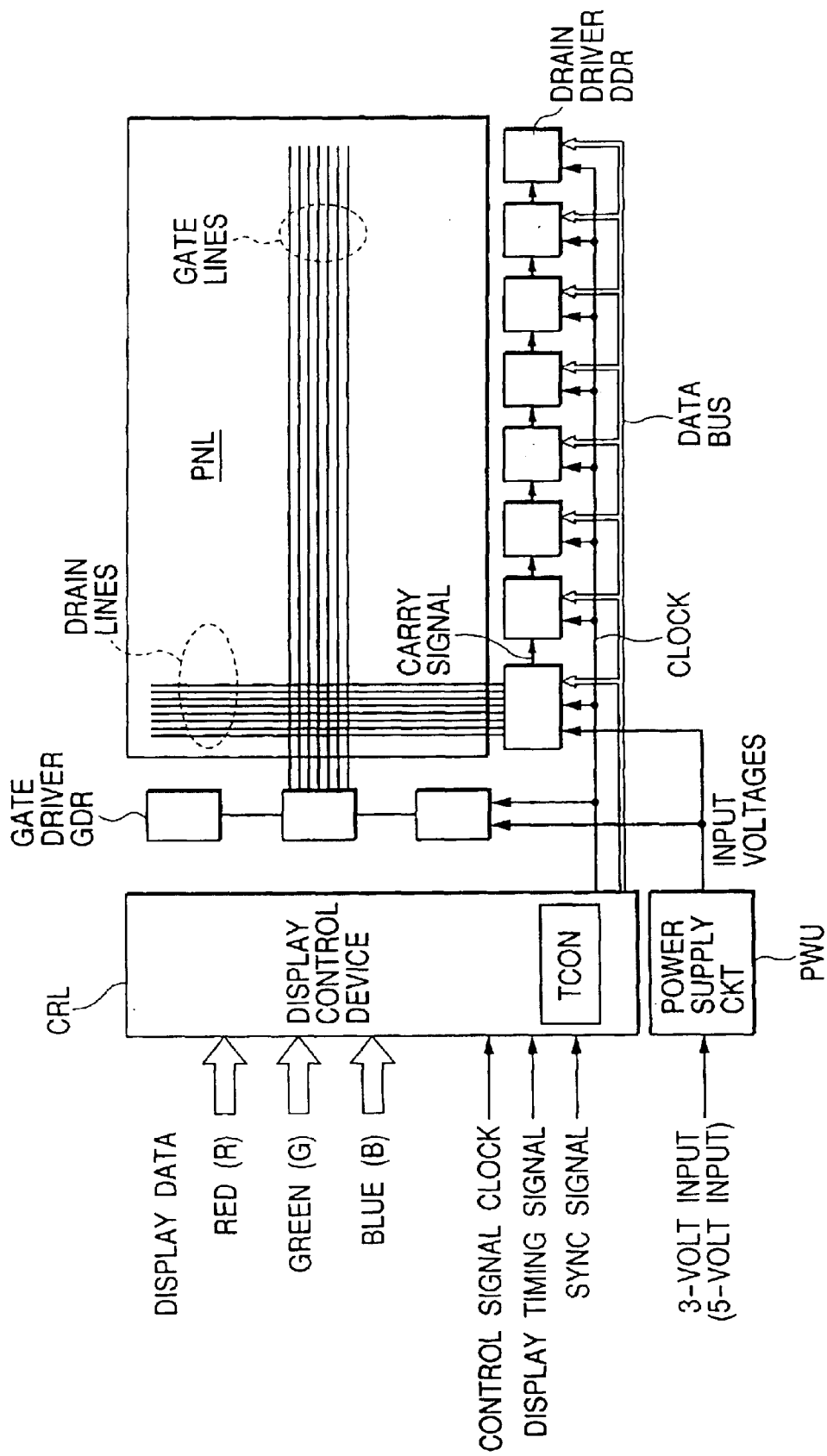
FIG. 18 is a block diagram of a liquid crystal display panel PNL and a circuit configuration of driving circuits and others disposed at the peripheries of the liquid crystal display panel PNL for explaining flows of display data and clock signals supplied to gate drivers and drain drivers.

FIG. 18 is a block diagram of the liquid crystal display panel PNL and a circuit configuration of driver circuits and others disposed at the peripheries of the liquid crystal display panel PNL for explaining flows of display data and clock signals supplied to the gate drivers and drain drivers.

In FIG. 18, the drain drivers DDR are disposed only at the bottom side of the liquid crystal display panel PNL of the thin film transistor (TFT) type, and the gate drivers GDR, the display control device CRL and the power supply circuit PWU are disposed at the left-hand side of the liquid crystal display panel PNL.

The drain drivers DDR are mounted on a multilayer flexible printed circuit board folded back behind the liquid crystal display panel PNL. The interface board (not shown) mounting the display control device CRL and the power supply circuit PWU is disposed behind the gate drivers GDR arranged around the short side of the liquid crystal display panel PNL. This arrangement is adopted to satisfy the need for making the width of information processing equipment as small as possible.

A carry signal output from one of the drain drivers DDR is input to a succeeding one of the drain drivers DDR.

Figure 19:
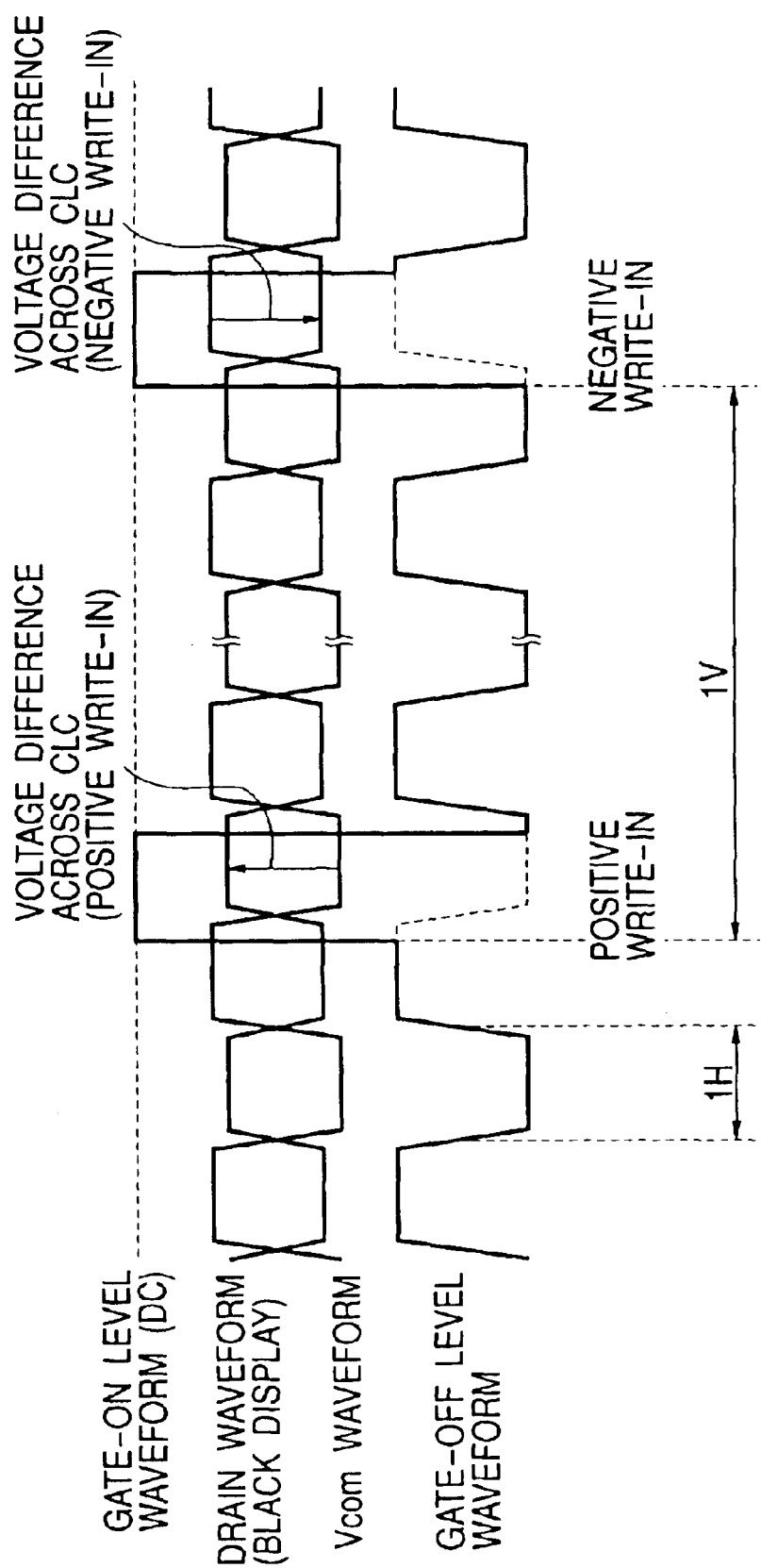
FIG. 19 illustrates voltage levels and waveforms of a common-electrode voltage, a drain voltage and a gate voltage.

FIG. 19 illustrates voltage levels and waveforms of a common-electrode voltage, a drain voltage and a gate voltage. The drain waveform depicts one for a black display. A gate-on level waveform (DC) and a gate-off level waveform vary between −9 V and −14 V, and the gate-on is provided at a voltage of 10 V. A drain waveform for a black display and a waveform of a common-electrode voltage Vcom applied to the common electrode vary between about 0 V and about 3 V. For example, a logical inversion is performed on a drain waveform for a black level bit by bit in a logic circuit and then is supplied to the drain drivers so as to vary the drain waveform with a horizontal scan period (1H), and the gate-off level waveform varies with approximately the same amplitude and phase as those of the common-electrode voltage Vcom.

Figure 20:
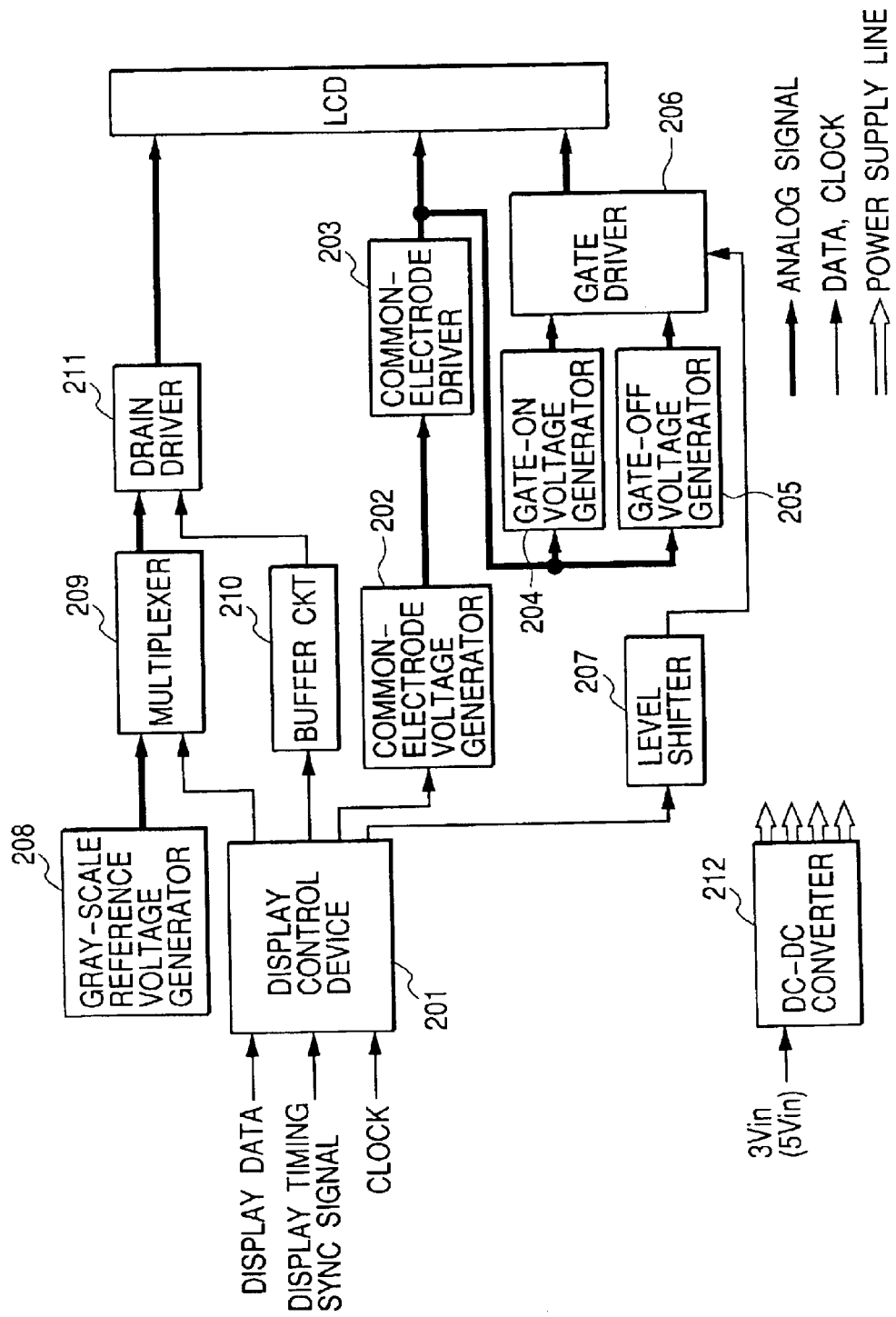
FIG. 20 is a block diagram illustrating rough configurations of drivers and flows of signals in a liquid crystal display panel.

FIG. 20 is a block diagram illustrating rough configurations of the drivers and flows of signals in the liquid crystal display panel. A buffer circuit 210 is provided in a display control device 201 (which corresponds to the display control device CRL in FIG. 18), and a drain driver 211 and a gate driver 206 correspond to the drain drivers DDR and the gate drivers GDR in FIG. 18, respectively.

The drain driver 211 comprises a data latch section for display data and an output-voltage generating circuit. A gray-scale reference voltage generating section 208, a multiplexer 209, a common-electrode voltage generating section 202, a common-electrode driver 203, a level shift circuit 207, a gate-on voltage generating section 204, a gate-off voltage generating section 205 and a DC—DC converter 212 are provided in the power supply circuit PWU.

Figure 21:
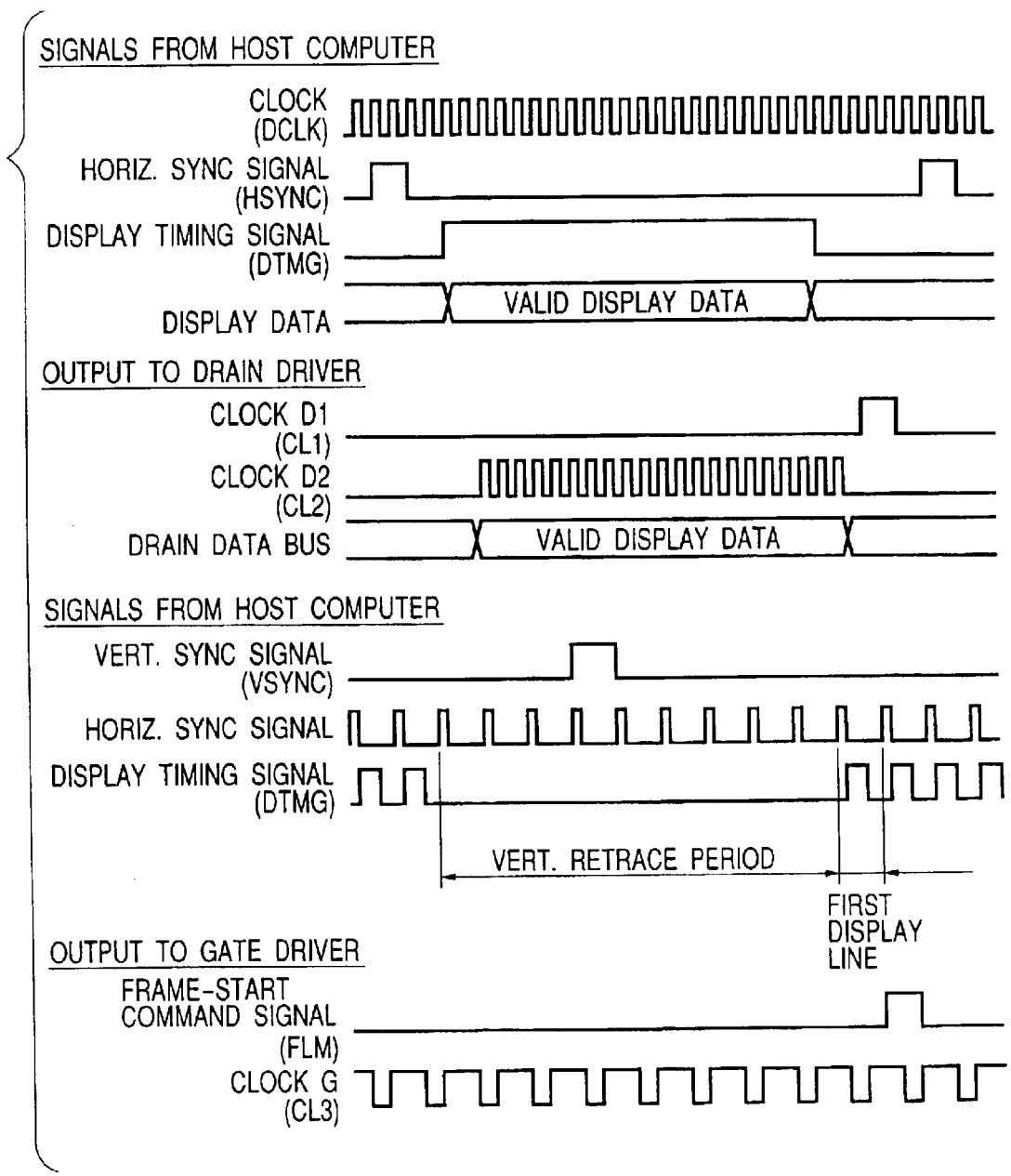
FIG. 21 is a timing chart illustrating display data supplied to a display control device from a host computer of information processing equipment and signals outputted to drain drivers and gate drivers from the display control device.

FIG. 21 is a timing chart illustrating display data supplied to the display control device from a host computer of the information processing equipment and the signals outputted to the drain drivers and the gate drivers from the display control device.

The display control device CRL shown in FIG. 18 receives the control signals (clock signals, display timing signals and sync signals) from the main body (the host computer), generates a clock D1 (CL1) and a shift clock D2 (CL2) serving as control signals for the drain drivers DDR and display data, and at the same time generates a frame-start command signal FLM and a clock G (CL3) serving as control signals for the gate drivers GDR and the display data.

Incidentally, in a system using LVDS signals (Low Voltage Differential Signals) for transferring display data from the main body, LVDS signal from the main computer are converted into original signals by an LVDS receiving circuit mounted on the interface board PCB, and then are supplied to the gate driver ICs and the drain driver ICs.

Figure 22:
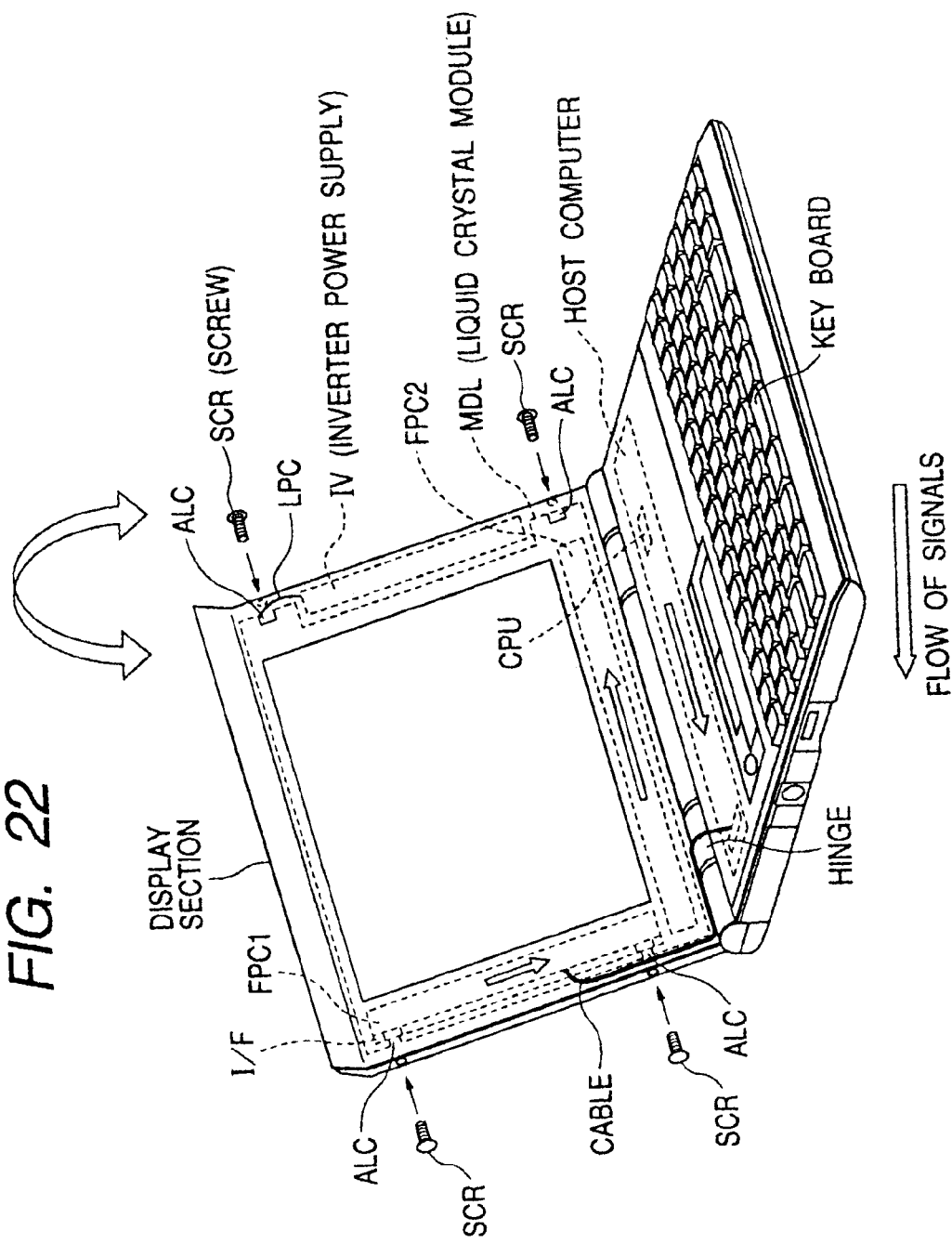
FIG. 22 is a perspective view of a notebook personal computer incorporating the liquid crystal display module in accordance with the present invention.

FIG. 22 is a perspective view of a notebook personal computer incorporating the liquid crystal display module in accordance with the present invention. This notebook personal computer employs the above-explained edge light type illuminating device in its display section. The liquid crystal display module MDL is fixed to its monitor case by inserting screws SCR into screw-receiving holes ALC made in the bottoms of the recessed portions of an upper frame of the liquid crystal display module MDL from the monitor case, and then engaging the screws SCR with tapped holes made in the molded case (not shown).

First, signals from a main body of information processing equipment go from a connector (an interface connector) disposed at approximately the center of the interface board I/F on the left-hand side of the notebook personal computer to a display control IC element (TCON, see FIG. 18), and display data are subjected to data conversion here and go to peripheral circuits for the drain drivers. In FIG. 22, reference character IV denotes a power supply for the illuminating device, which supplies a supply voltage to linear lamps of the illuminating device through a power supply cable LPC.

Figure 23:
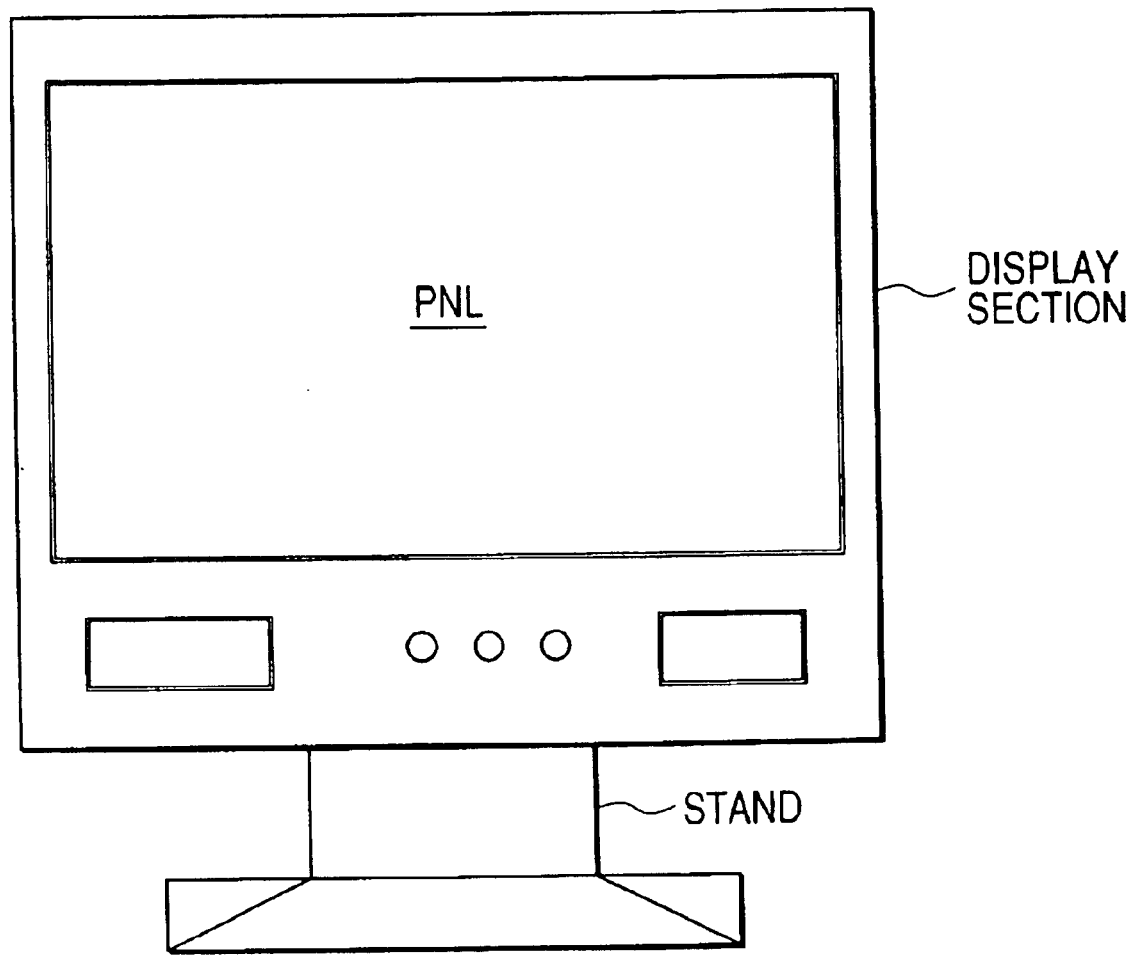
FIG. 23 is a front view of a liquid crystal display monitor incorporating the liquid crystal display module in accordance with the present invention.

FIG. 23 is a front view of an example of a liquid crystal display monitor incorporating the liquid crystal display module in accordance with the present invention. The backlight of the liquid crystal display module incorporated into a display section of the liquid crystal display monitor is of the type which is secured by screws at its rear side as explained in connection with FIGS. 14–15 or 16. This structure realizes the reduction of a border area around a useful display area of the display section, and suppresses the reduction of the outside dimensions of the liquid crystal display monitor.

Application of the liquid crystal display device in accordance with the present invention is not limited to the above-explained notebook personal computer and liquid crystal display monitor, but the present invention is also applicable to a monitor of a desktop personal computer, a liquid crystal TV receiver set, or a display device of other equipment.

The mounting structure in accordance with the present invention eliminates the restriction on the width and the external shape of a display section of information processing equipment, and provides a small-size and low power-consumption information processing equipment.

A space required for fixing the liquid crystal display module can be reduced, and thereby a portion of a display section can be reduced which does not contribute to displaying, that is, a border area around a useful display area of the display section. Further, a useful display area of the liquid crystal display module MDL can be increased.

The present invention has been explained concretely based upon the embodiments, but the present invention is not limited to the above-described embodiments, and it is needless to say that various changes and modifications may be made without departing from the nature and spirit of the present invention. For example, the above embodiments have been described as applying the present invention to the active matrix type liquid crystal display devices, but the present invention is equally applicable to a simple-matrix type or other type liquid crystal display devices.

As explained above, the mounting structure in accordance with the present invention is capable of mounting the liquid crystal display module to a display section of equipment such as the notebook personal computer and the liquid crystal display monitor with suppressing sufficiently the increase in the border area around a useful display area of the liquid crystal display monitor and ensuring sufficient mounting strength. By realizing the reduction of the border area around a useful display area of the liquid crystal display monitor and that of outside dimensions of a housing (a case) of the liquid crystal display monitor or the like, the present invention provides the liquid crystal display module superior in space saving and capable of enlarging a screen size visually and the liquid crystal display monitor incorporating the liquid crystal display module.

What is claimed:

1. A liquid crystal display monitor, comprising:
   a liquid crystal display module including a first frame, a liquid crystal display panel having a liquid crystal layer sandwiched between a pair of substrates, an illuminating device disposed behind said liquid crystal display panel, and a second frame for arrangement in the order named, with said first frame and said second frame for fixing said liquid crystal display panel and said illuminating device therebetween in cooperation with each other;
   a housing having a mounting structure facing a rear surface of said second frame for mounting said liquid crystal display panel to said housing, said mounting structure being provided with at least one hole for passing at least one screw therethrough for affixing said liquid crystal display panel to said mounting structure; and
   said rear surface of said second frame being provided with at least one tanned hole for engagement with a corresponding one of said at least one screw, and a thickness of said second frame in the vicinity of said at least one tapped hole being greater than a thickness of the remainder of said second frame, wherein said illuminating device comprises a plurality of line light sources arranged behind said liquid crystal display panel and a reflector disposed behind said plurality of line light sources, with said reflector being shaped to have portions protruding toward said liquid crystal display panel between said plurality of line light sources and portions convex toward said second frame behind said plurality of line light sources, and with said at least one tapped hole being provided in portions of said second frame corresponding to said portions of said reflector protruding toward said liquid crystal display panel.

2. The liquid crystal display monitor according to claim 1, wherein said first frame is provided with an opening for exposing at least a central area of one of said pair of substrates.

* * * * *